Figure 1:
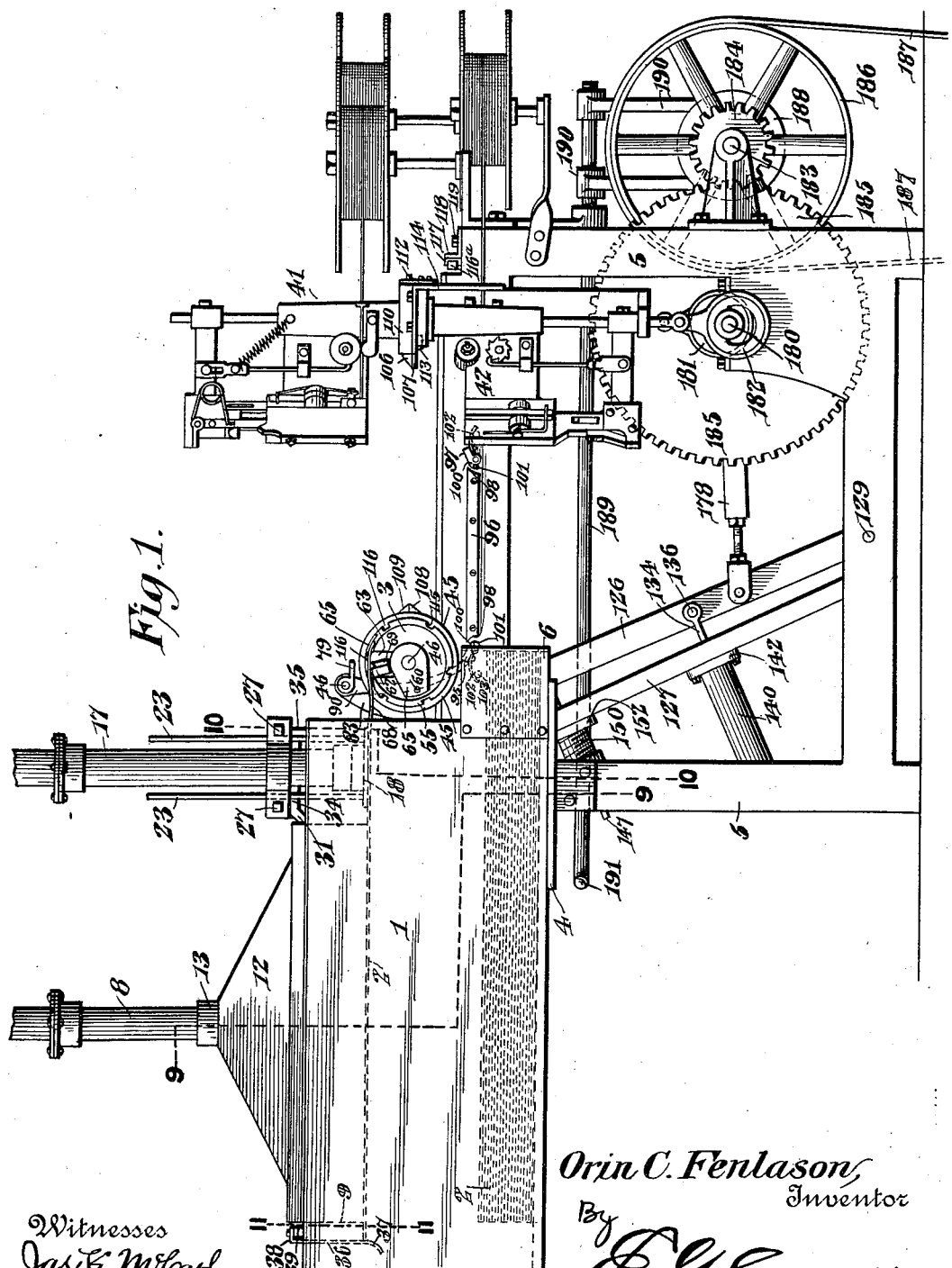

O. C. FENLASON.
AUTOMATIC MACHINE FOR MAKING FOLDABLE OR COLLAPSIBLE BERRY BOXES.
APPLICATION FILED FEB. 21, 1908.

1,008,632.

Patented Nov. 14, 1911.
10 SHEETS—SHEET 1.

Witnesses
Jas. K. McCathran
H. F. Riley

Orin C. Fenlason,
Inventor
By
E. G. Siggers
Attorney

COLUMBIA PLANOGRAPH CO., WASHINGTON, D. C.

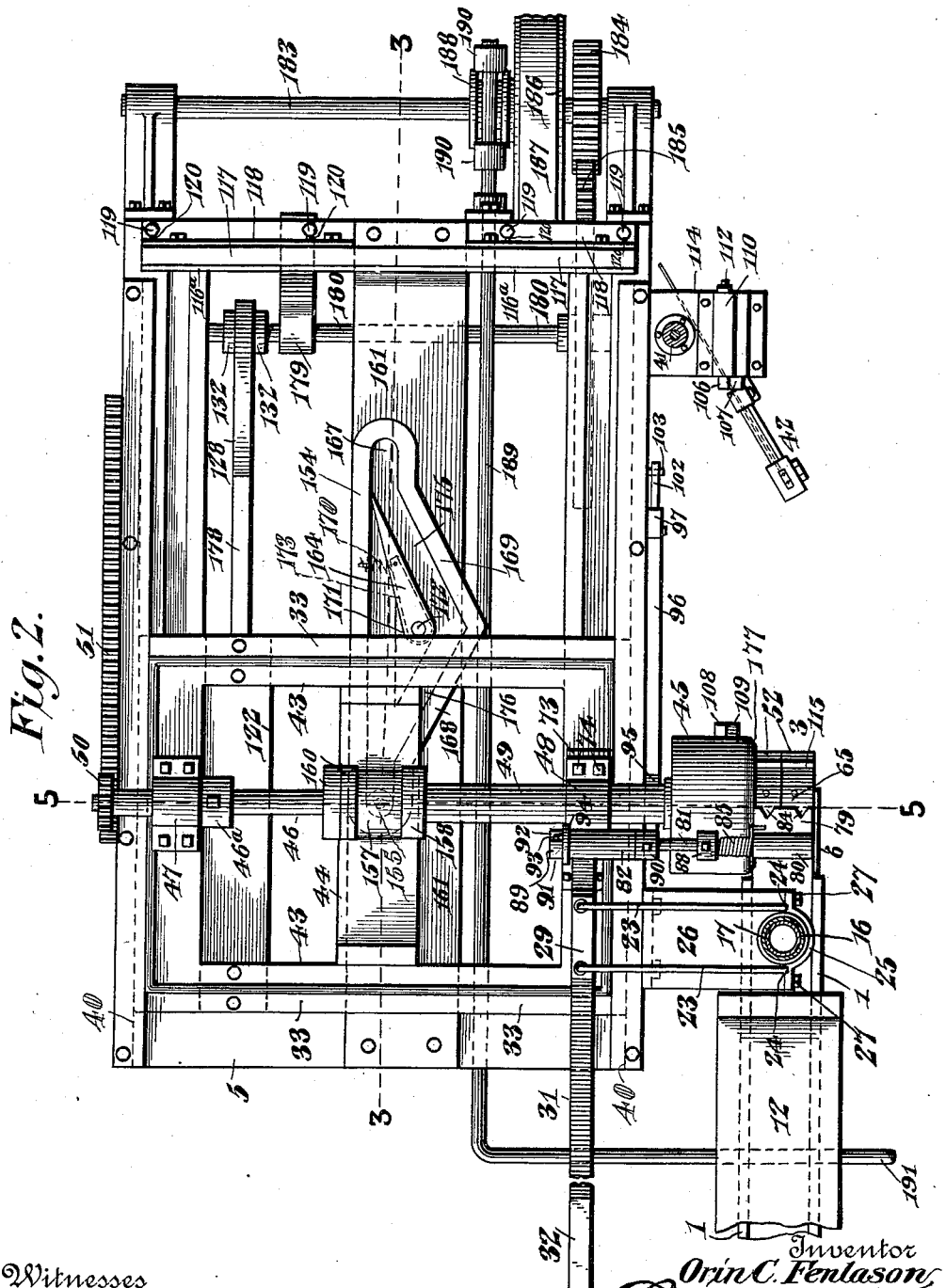

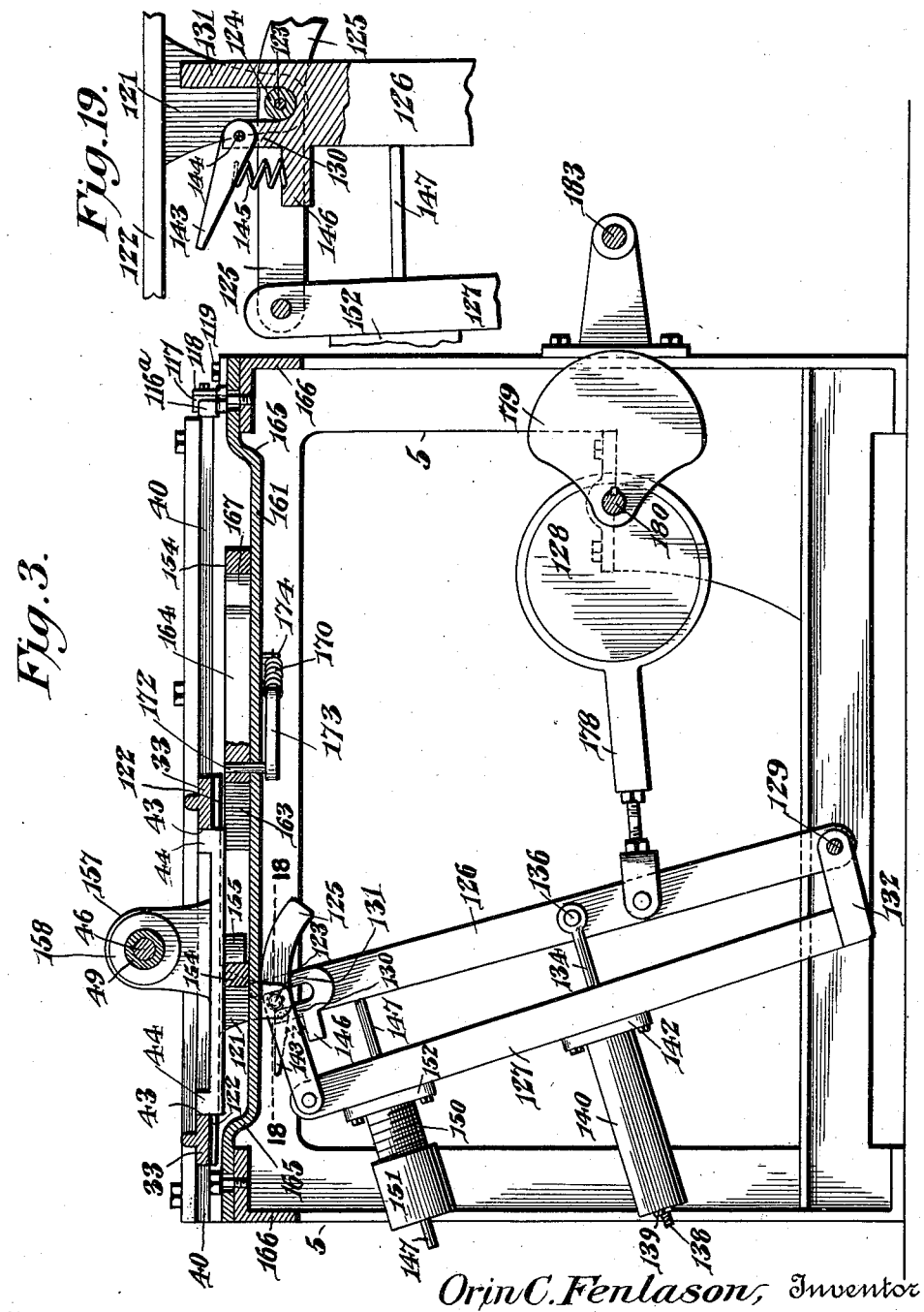

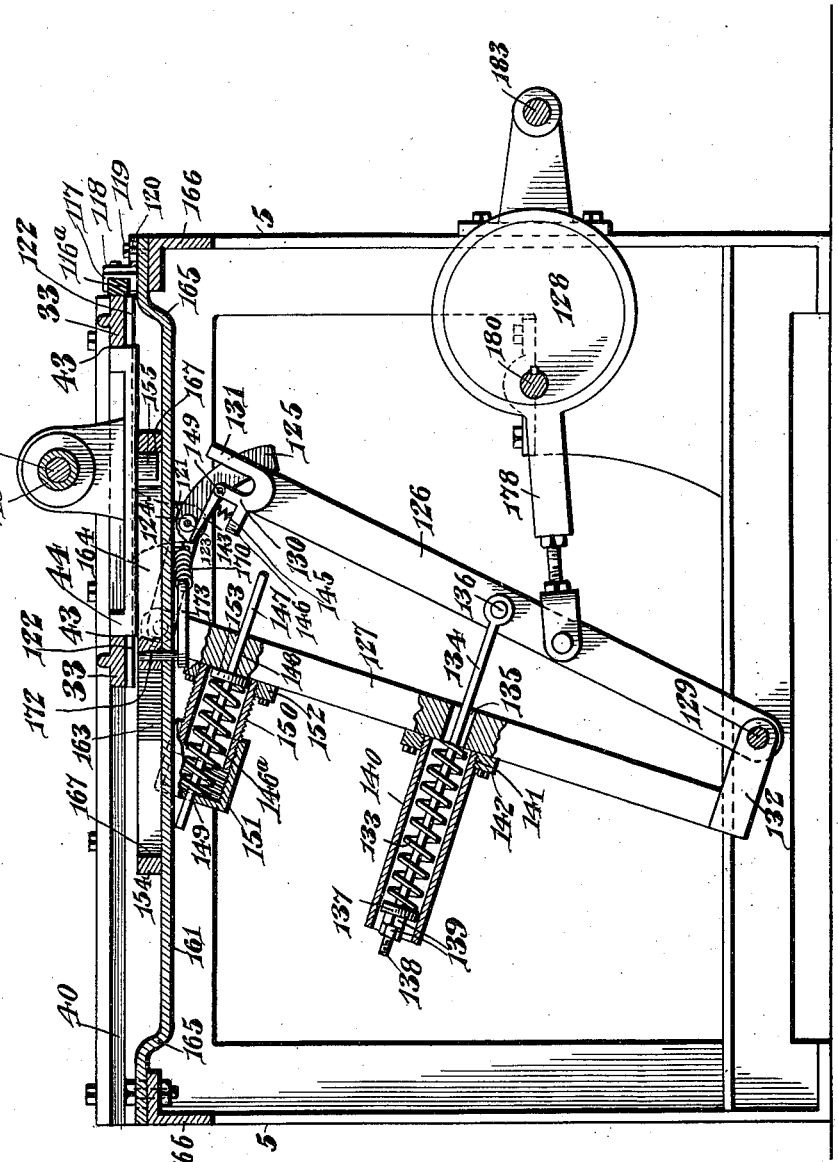

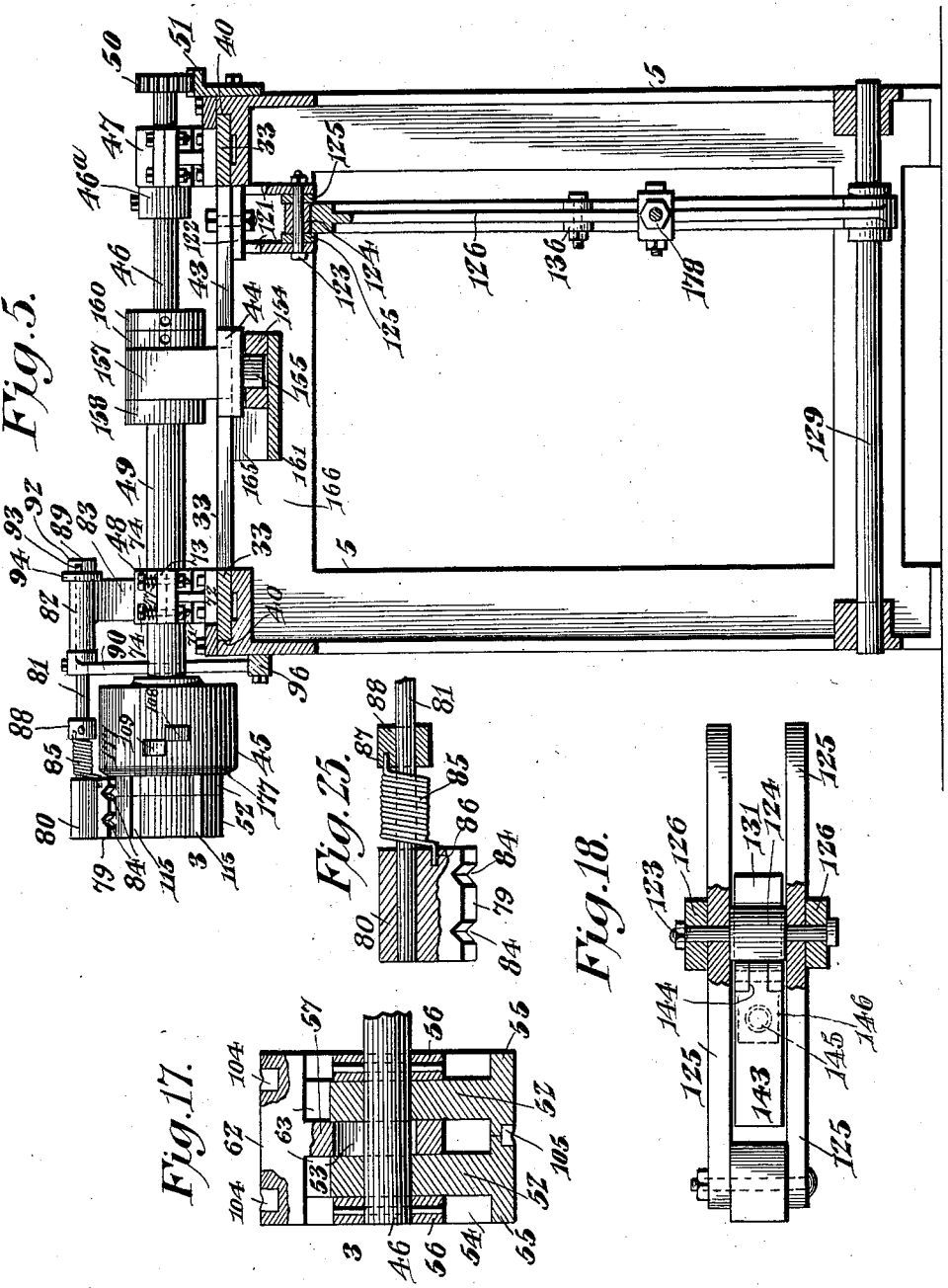

O. C. FENLASON.
AUTOMATIC MACHINE FOR MAKING FOLDABLE OR COLLAPSIBLE BERRY BOXES.
APPLICATION FILED FEB. 21, 1908.
1,008,632.
Patented Nov. 14, 1911.
10 SHEETS—SHEET 6.
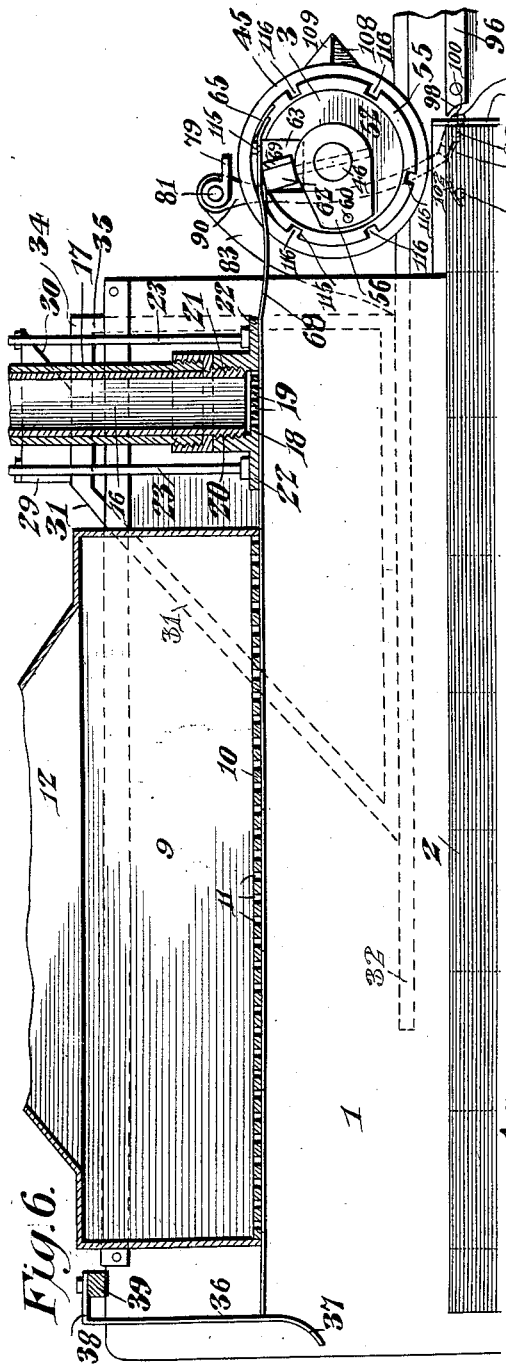

O. C. FENLASON.
AUTOMATIC MACHINE FOR MAKING FOLDABLE OR COLLAPSIBLE BERRY BOXES.
APPLICATION FILED FEB. 21, 1908.
1,008,632.
Patented Nov. 14, 1911.
10 SHEETS—SHEET 7.
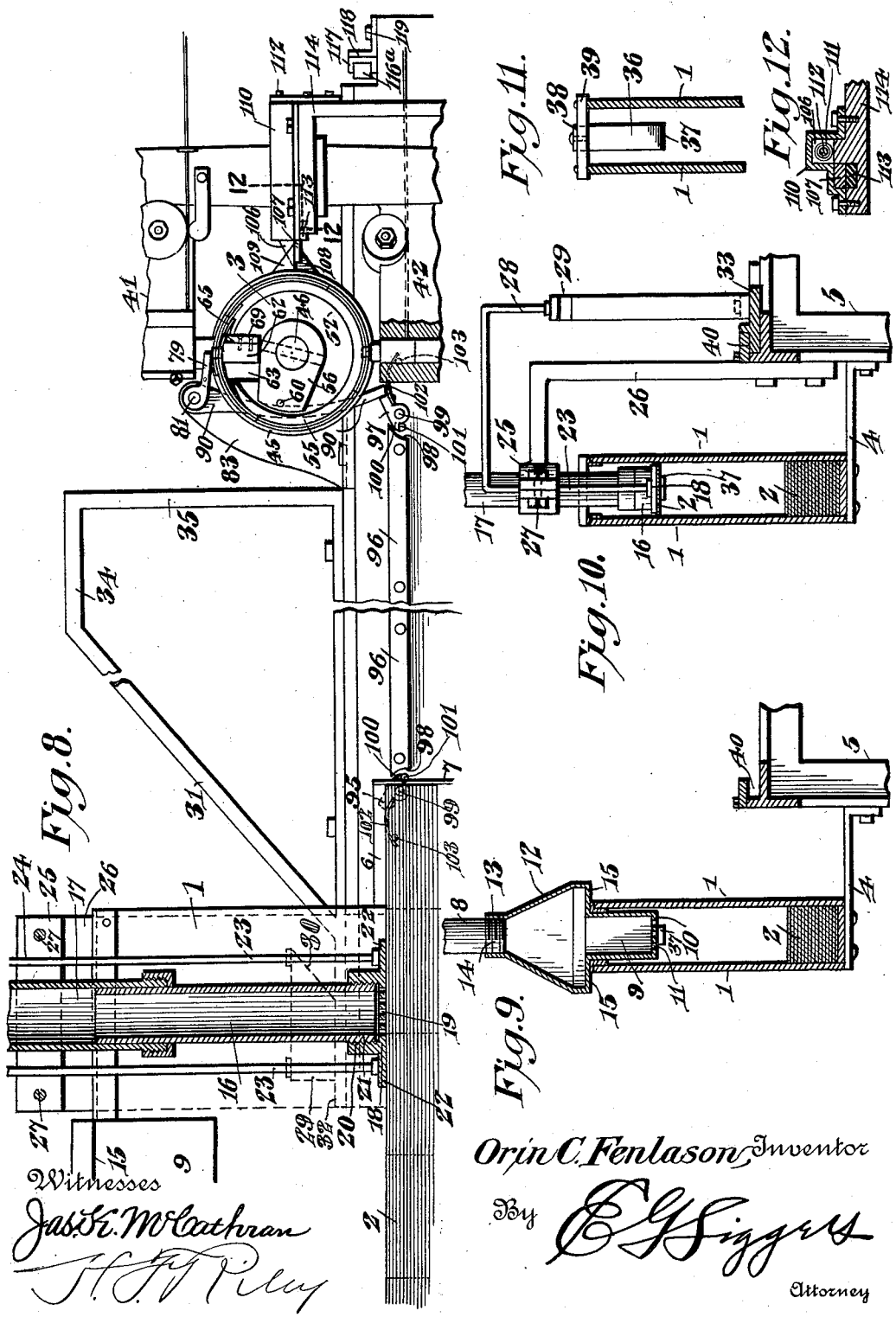
Orin C. Fenlason, Inventor
Witnesses

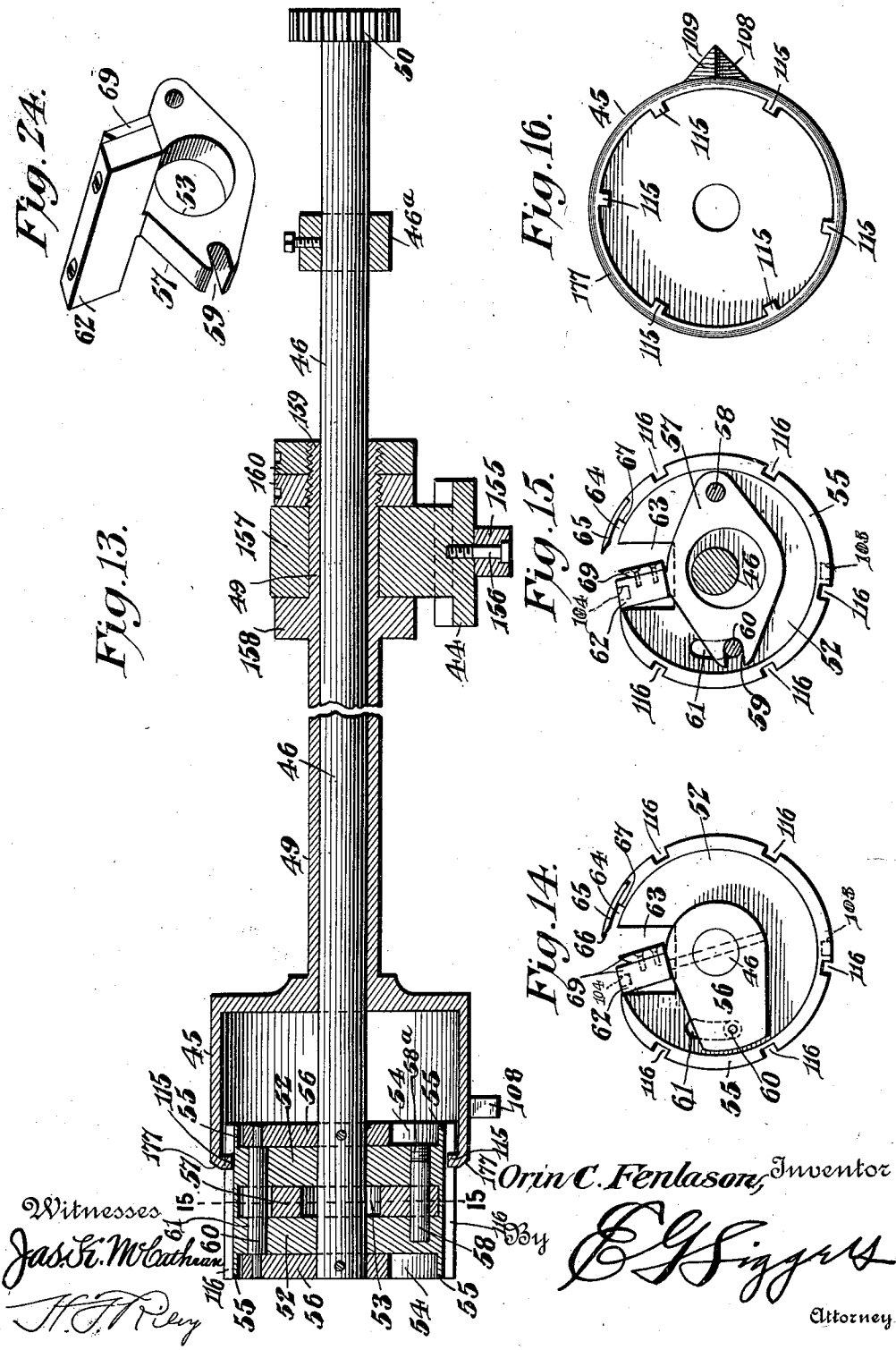

O. C. FENLASON.
AUTOMATIC MACHINE FOR MAKING FOLDABLE OR COLLAPSIBLE BERRY BOXES.
APPLICATION FILED FEB. 21, 1908.
1,008,632.
Patented Nov. 14, 1911.
10 SHEETS—SHEET 9.
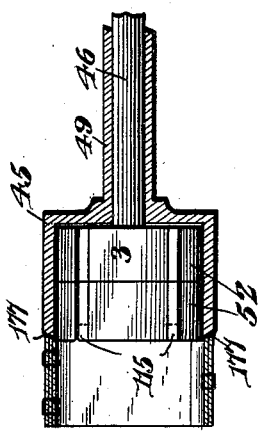
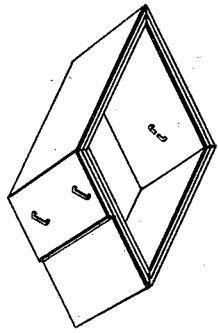
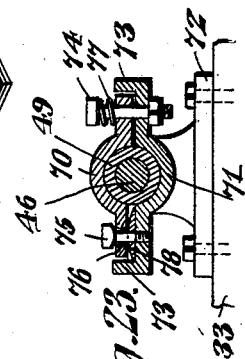
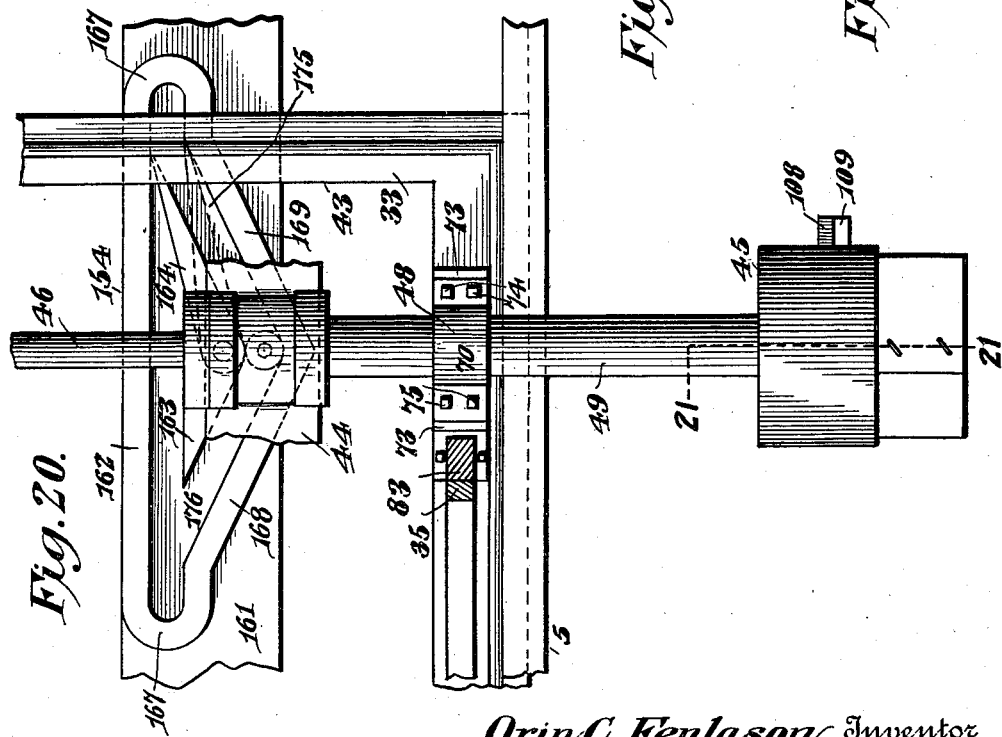
Orin C. Fenlason, Inventor
Witnesses O. C. FENLASON.
AUTOMATIC MACHINE FOR MAKING FOLDABLE OR COLLAPSIBLE BERRY BOXES.
APPLICATION FILED FEB. 21, 1908.
1,008,632.
Patented Nov. 14, 1911.
10 SHEETS—SHEET 10.
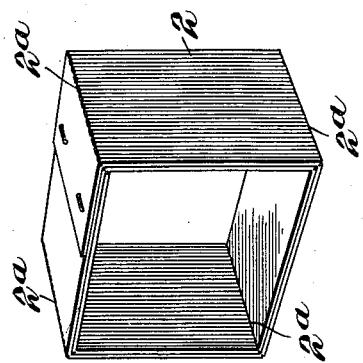
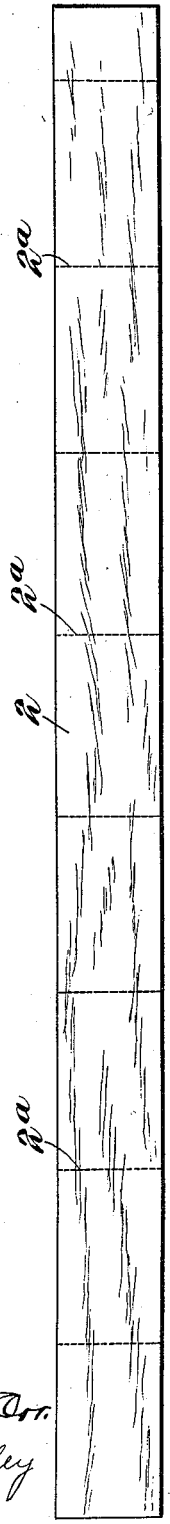
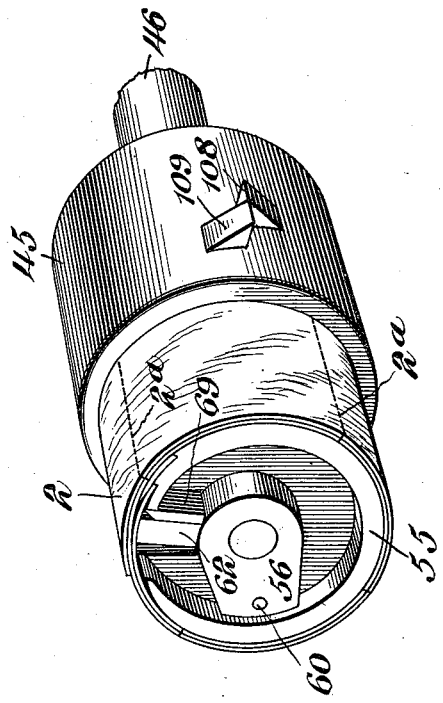
Witnesses
Howard D. Orr.
H. W. Riley
Orin C. Fenlason, Inventor,
By E. G. Siggers
Attorney
COLUMBIA PLANOGRAPH CO., WASHINGTON, D. C.

UNITED STATES PATENT OFFICE.

ORIN C. FENLASON, OF HOQUIAM, WASHINGTON.

AUTOMATIC MACHINE FOR MAKING FOLDABLE OR COLLAPSIBLE BERRY-BOXES.

1,008,632.  Specification of Letters Patent.  Patented Nov. 14, 1911.

Application filed February 21, 1908. Serial No. 417,168.

*To all whom it may concern:*

Be it known that I, ORIN C. FENLASON, a citizen of the United States, residing at Hoquiam, in the county of Chehalis and State of Washington, have invented a new and useful Automatic Machine for Making Foldable or Collapsible Berry-Boxes, of which the following is a specification.

The invention relates to an automatic machine for making foldable or collapsible berry boxes.

The object of the present invention is to provide a simple and comparatively inexpensive automatic machine, adapted to take a previously scored sheet of veneer, feed it to and wind it around a form, fasten the veneer together by wire staples to make a box body while the same is on the form, and finally discharge the box body from the form.

A further object of the invention is to provide an automatic machine of this character, adapted to enable a box body, consisting of a rectangular band of veneer, to be constructed on a round form.

Another object of the invention is to provide a box making machine, adapted to receive the veneer in the form of sheets, and provided with a pneumatically operated device adapted to dispense with the mechanical means heretofore employed for feeding veneer from the bottom of a pile or stack, and capable of positively taking a sheet of veneer from the top of a pile or stack and feeding the same to the form, whereby the veneer may be handled with greater rapidity and facility and without liability of injuring the same during the feeding operation.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a veneer box making machine, constructed in accordance with this invention. Fig. 2 is a plan view of the same. Fig. 3 is a longitudinal sectional view, taken substantially on the line 3—3 of Fig. 2, the carriage being in its initial position. Fig. 4 is a similar view, the carriage being at the limit of its rearward movement, and the upper and lower cushioning devices of the auxiliary rock arm being in section. Fig. 5 is a transverse sectional view, taken substantially on the line 5—5 of Fig. 2. Fig. 6 is an enlarged detail sectional view of a portion of the machine, illustrating the construction of the magazine and the pneumatically operated means for feeding the veneer, the cylindrical head or form being in its initial position. Fig. 7 is an enlarged elevation of a portion of the machine, the head or form being in an intermediate position. Fig. 8 is an enlarged detail view partly in section, the head or form being at the limit of its rearward movement and the parts being in position for stapling the veneer. Fig. 9 is a detail sectional view, taken substantially on the line 9—9 of Fig. 1. Fig. 10 is a similar view, taken substantially on the line 10—10 of Fig. 1. Fig. 11 is a detail sectional view, taken substantially on the line 11—11 of Fig. 1. Fig. 12 is a detail sectional view, taken substantially on the line 12—12 of Fig. 8. Fig. 13 is an enlarged detail sectional view of the head or form and the ejector. Fig. 14 is an end view of the rotary head or form. Fig. 15 is a sectional view, taken substantially on the line 15—15 of Fig. 13. Fig. 16 is an end view of the ejector. Fig. 17 is a transverse sectional view of the rotary head or form, illustrating the arrangement of the wire clench blocks. Fig. 18 is an enlarged detail sectional view, taken substantially on the line 18—18 of Fig. 3. Fig. 19 is an enlarged detail sectional view, illustrating the construction for connecting the rock arm with the reciprocatory carriage. Fig. 20 is an enlarged plan view, illustrating the manner of ejecting a box body from the machine. Fig. 21 is a sectional view, taken substantially on the line 21—21 of Fig. 20. Fig. 22 is a detail perspective view of the completed box body as it is discharged from the machine. Fig. 23 is an enlarged detail sectional view of the friction device for engaging the sleeve of the ejector. Fig. 24 is a detail perspective view of the combined veneer clamping and form actuating member. Fig. 25 is a detail view, illustrating the manner of mounting the clamp for engaging the veneer exteriorly of the head or form. Fig.

26 is a plan view of a strip of veneer illustrating the arrangement of the scoring. Fig. 27 is an enlarged detail perspective view, showing the coiled veneer on the form. Fig. 28 is an enlarged view of the box, illustrating the rectangular shape assumed by the box after it has been ejected from the form.

Like numerals of reference designate corresponding parts in all the figures of the drawings.

The machine is equipped with a magazine 1 for the reception of sheets 2 of veneer, which are placed within the magazine in a stack or pile. The veneer is previously scored at intervals, and roller scoring, consisting of rows of spaced perforations, being preferably employed. Each sheet of veneer, as hereinafter more fully explained, is wound around a head or form 3, and while the sheet of veneer is in the form of a hoop or band, its overlapped ends are secured together to form a box body. The resiliency of the veneer and the scoring of the same at the corners of the box cause the box body, when discharged from the head or form, to assume a rectangular shape. The magazine, which is arranged at one end of the machine, is mounted on a suitable bracket 4, secured to the front side of the frame 5 of the machine, as clearly illustrated in Fig. 1 of the drawings. The magazine, which is constructed of suitable metal, is composed of a horizontal bottom and vertical side walls, and it is provided at the inner or rear end with an extension 6, consisting of two sides and a transverse end wall 7, which forms a stop for the inner ends of the sheets of veneer, as clearly illustrated in Figs. 6 to 8 inclusive of the drawings. The inner end or portion of the magazine is arranged upon the bracket 4 at the front of the frame of the machine, and the outer end of the magazine is open to enable the sheets of veneer to be readily placed in the same.

The veneer is taken from the top of the pile or stack and is held in position to be fed or delivered to the head or form 3 by pneumatically operated means, consisting of a fixed vacuum or suction device and a vertically movable vacuum or suction device. By taking the sheets of veneer from the top of the stack or pile, the veneer is handled and supplied to the head or drum more readily, and is not injured in such feeding operation, as it is when mechanical means are employed for feeding the sheets from the bottom of the stack or pile. The fixed vacuum or suction device comprises a vacuum tube 8 and a foot 9, located within the upper portion of the magazine and provided with a horizontal bottom 10, having perforations 11. The vacuum tube is connected with an exhaust or suction fan (not shown) of any preferred construction, and when a sheet of veneer is arranged against the perforated bottom of the fixed suction device, the suction created by exhausting the air within the foot and vacuum tube firmly holds the sheet of veneer flat against the bottom of the foot. The foot 9, which fits between the sides of the magazine, is provided with an enlarged upwardly tapered top portion 12, which is connected at its apex with the tube 8. The tapered or top portion 12 of the foot 9 is preferably provided with an interiorly threaded collar 13, and the lower end 14 of the vacuum tube 8 is threaded to engage the collar 13. The tapered upper portion 12 of the foot projects laterally beyond the sides of the magazine, and the laterally projecting portions form shoulders 15, whereby the foot is supported upon the upper edges of the sides of the magazine.

The suction device, which lifts the top sheet of veneer from the stack or pile to the fixed suction device, comprises a vertically movable vacuum tube 16, which telescopes into a stationary tube 17, connected with a suitable exhaust or suction fan (not shown). The vertically movable tube 16 is equipped at its lower end with a foot 18, presenting a flat lower face to the veneer and having perforations 19, communicating with the interior of the suction tube. The foot 18 is provided with an interiorly threaded socket 20 to receive the lower threaded end 21 of the vertically movable vacuum tube, and it has extensions 22 forming continuations of the bottom of the shoe and connected to the lower ends of vertically movable lifting rods 23. The lifting rods 23, which are located in advance and in rear of the tubes 16 and 17, are spaced from the same and extend through guide openings 24 of a clamp 25 of a substantially L-shaped bracket arm 26. The L-shaped bracket arm 26, which is secured to the frame of the machine at a point above the bracket 4, consists of an upwardly extending vertical portion and an outwardly extending horizontal portion. The clamp 25, which is sectional, engages the tube 17 and secures the same to the bracket arm 26, which forms a support for the said tube 17. The clamp 25, which is arranged horizontally, is composed of inner and outer sections, the inner section being formed integral with the bracket arm and the outer section being detachably secured to the inner section by means of bolts 27. The lifting rods, which are approximately U-shaped, are composed of inner and outer vertical portions and top connecting portions, the outer vertical portions being secured to the foot of the vertical movable vacuum tube 16. The inner or rear vertical portions 28 of the lifting rods are connected with a shoe 29, provided with a beveled inner end 30 and arranged to be engaged by a horizontal reciprocatable wedge 31. The shoe 29, which consists of a block or piece, is provided with a horizontal lower edge 32 and its inner beveled portion is wedge-shaped, the beveled edge extending downwardly and inwardly toward the central portion of the shoe. The wedge 31, which is mounted on a reciprocatory carriage 33, consists preferably of an open frame having a horizontal bottom portion, an inclined actuating portion, a horizontal top supporting portion 34, and a vertical end portion 35. The inclined actuating portion of the reciprocatory wedge engages the inclined edge of the shoe and lifts the tube 16, the wedge moving beneath the shoe until the horizontal top supporting portion 34 is carried beneath the horizontal bottom edge of the shoe, as illustrated in Fig. 6 of the drawings, and when the wedge is carried away from the shoe by the reciprocation of the carriage, the tube 16 is permitted to descend and rest upon the stack or pile of veneer within the magazine, the downward movement of the tube 16 being limited by the veneer. When the vacuum tube 16 is moved upwardly, it carries with it a sheet of veneer, which is conveyed to the stationary suction device, whereby it is held in position to be engaged by the rotary head or form 3.

The sheet of veneer carried upward by the suction device is properly positioned by means of a front guide 36, consisting of a lower curved guiding portion 37 and an upper vertical portion, arranged in spaced relation with the foot of the stationary suction device and forming a stop for the sheet of veneer. The guiding portion 37 curves downwardly and outwardly, and it guides the sheet of veneer in its upward movement. The guide 36 is provided at its top with a horizontal supporting arm 38, which is secured to a cross piece 39, mounted upon and supported by the upper edges of the sides of the magazine.

The frame 5 of the machine is composed of spaced sides and suitable connecting portions, and it is provided at the top with horizontally disposed longitudinal ways 40 for the carriage 33, which is reciprocated by the means hereinafter described to move the carriage from the magazine at the front of the frame to upper and lower stapling devices 41 and 42, located at the rear end of the frame. The movement of the carriage from the magazine, which is located at the front of the machine, to the stapling devices, which are arranged at the rear end of the frame, is designated as the rearward movement of the carriage, and during such movement of the carriage, the veneer is gripped by the rotary head or form, withdrawn from the magazine, wound on the said head or form and finally stapled at the end of such movement, and during the return or forward movement of the carriage the stapled band or hoop of veneer, constituting the box body, is discharged from the head or form. The stapling devices, which may be of any well known construction and which operate in the usual manner, do not constitute a portion of the present invention, and a detail description and illustration of the various parts thereof is deemed unnecessary.

The carriage 33, which may be of any preferred construction, preferably consists of an open rectangular frame, and is composed of parallel ends and connecting front and rear sides. The ends of the carriage are arranged in the ways 40 of the frame of the machine, and the inner edges 43 of the front and rear sides of the frame of the machine form guides for a laterally movable slide 44, which actuates an ejector 45 for discharging the box body from the head or form. The slide 44, which is mounted on a transverse shaft 46, is guided on and braced by the carriage, which receives the end thrust incident to the ejecting operation, hereinafter explained, whereby the shaft 46 is relieved of such strain. The carriage is provided at its ends with a bearing 47 and a combined bearing and friction device 48, located at opposite sides of the frame, as clearly illustrated in Fig. 2 of the drawings. The bearing 47 receives the shaft 46, and an adjustable collar 46$^a$ is mounted on the shaft adjacent to the bearing 47. The combined bearing and friction device, which is adapted to create sufficient resistance to enable the veneer to be pulled away from the suction device, as hereinafter more fully explained, directly receives and engages a sleeve 49, arranged on the shaft 46 and connected with the ejector 45. The front end of the transverse shaft 46 carries the rotary head or form 3, and the rear end of the shaft is provided with a pinion 50, which meshes with a stationary rack 51, whereby when the carriage is reciprocated the transverse shaft will be rotated. The shaft 46 is rotated in one direction by the rearward movement of the carriage, and it is rotated in the reverse direction when the carriage moves forwardly. In practice, the rack will be equipped with forty teeth of one half inch circle or diameter pitch, and the pinion will be provided with nineteen teeth, which will produce two and one nineteenths revolution of the pinion and the shaft 46 during each rearward and forward movement of the carriage. This will give the veneer two complete winds on the head or form. The excess of the rotary movement of the shaft and the pinion operates the clamping means for engaging the veneer prior to rotating the head or form, as hereinafter more fully explained. The head or form is reciprocated and rotated, it being simply reciprocated, without rotating, at the beginning of each of the rearward and forward movements of the carriage. The head or form remains stationary with relation to the carriage during the rearward movement thereof, while the veneer is being gripped, and the head or form also remains stationary with relation to the carriage at the beginning of the forward or return movement, while it is being disengaged from the devices for positively locking the head or form against rotary movement during the stapling operation, and also while the stapled veneer is being released.

The rotary head or form is composed of two substantially circular sections 52, provided at their inner and outer faces with side recesses 53 and 54, which form laterally projecting peripheral flanges 55, extending from the inner and outer side faces of the sections, as clearly illustrated in Fig. 13 of the drawings. The sections 52 are provided with central openings, and are arranged on the front end of the transverse shaft 46. The outer recesses 54 of the sections 52 receive arms 56 of the shaft 46, and the inner recesses 53 form a central interior chamber to receive the stem or web 57 of a substantially T-shaped combined veneer clamping and form actuating member. The stem or web 57, which is oppositely tapered or approximately diamond shaped, is pivotally connected at one end with the sections of the head or form by an eccentrically arranged pin 58, and its other end is provided with a bifurcation 59, which receives a pin 60, extending through an arcuate slot 61 of the sections 52 and connected at its terminals with the arms 56. The opening for the pin 58 extends through one of the sections and terminates short of the outer face of the other section, as clearly shown in Fig. 13, and the said pin is retained in the opening by a short screw 58ª, which engages interior screw threads of the contiguous section. The engaging portion 62 of the veneer clamping and form actuating member consists of a narrow block or piece, extending laterally from the opposite sides of the stem or web 57 and arranged in a transverse recess 63 of the head or form. The engaging portion of the veneer clamping or gripping member is of a thickness less than the width of the transverse recess 63, and is movable from one side to the other thereof. By this construction the shaft 46 has a limited rotary movement independently of the head or form during the movement of the engaging portion of the veneer gripping member from one side of the recess 63 to the other.

The head or form is provided at the rear wall of the recess 63 with a narrow veneer receiving groove 64, arranged concentric with the periphery of the head or form and preferably formed by a recess therein and a curved guiding plate 65, secured to the head or form and provided with a projecting portion 66, beveled at the inner face and extending beyond the inner side wall of the groove 64 and adapted to guide the end of the veneer into the said groove at the limit of the return movement of the carriage. The curved guiding plate 65 has its inner attached portion let into a recess in the periphery of the recess of the head or form to arrange the outer face of the guiding plate 65 in flush relation with the periphery of the head or form.

When the forward movement of the carriage carries the head or form into engagement with the projecting inner end of the sheet of veneer held by the suction device, the veneer is guided into the groove 64, and is engaged with the end wall 67 thereof before the carriage reaches the limit of its forward or return movement, whereby the veneer is buckled or bowed, as shown at 68 in Fig. 6 of the drawings. In practice the sheet buckles more or less at different points, and this buckling or bowing of the veneer operates to retain the edge of the same in the groove 64, while the gripping member of the head or form is moving from the front wall of the recess 63 to the rear wall thereof to carry a jaw 69 into engagement with the veneer. The veneer is firmly gripped between the plate 65 and the jaw 69. During the oscillatory movement of the clamping member from the front wall of the recess 63 to the rear wall thereof, the head or form remains stationary with relation to the carriage, but moves away from the magazine with the carriage. During this interval while the head or form is stationary with respect to the carriage, the straightening of the bowed or buckled portions of the veneer through the resiliency of the material serves to retain the edge of the veneer in the groove, and enables the veneer to be positively gripped by the jaw 69. The jaw 69 preferably consists of a plate of steel, or other suitable material, secured to the rear side face of the engaging portion 62 of the interior gripping or clamping member of the head or form and having its outer edge beveled at the side adjacent to the clamping portion 62. When the carriage moves rearwardly, the head or form is held against rotary movement by the combined friction device and bearing 48 until the interior gripping member of the head or form is carried into engagement with the veneer. The rotation of the shaft 46 through the fixed rack and the pinion 50 oscillates the arms 56 and moves the interior gripping member into engagement with the veneer. As soon as the gripping member engages the veneer, the rotary movement of the shaft is communicated to the head or form, which winds the sheet of veneer around it simultaneously pulling the sheet from the suction devices of the magazine.

In order to enable the veneer to be gripped with sufficient force to draw the sheet from the suction devices of the magazine, the sleeve of the ejector is frictionally engaged by the combined bearing and friction device 48. The combined bearing and friction device 48 is composed of upper and lower sections 70 and 71, the lower section being provided with a suitable base 72, which is secured to the front end of the carriage. The lower section 71 is also provided with end walls or flanges 73, between which is arranged the upper section 70, and the latter is secured by bolts 74 and screws 75 to the lower section. The screws 75, which are provided at their upper ends with heads, pass through slots 76 of the upper section 70 and engage threaded perforations of the lower section. The bolts pierce the upper and lower sections and receive coiled springs 77, interposed between the heads of the bolts and the upper section for yieldably maintaining the same in engagement with the sleeve 49 of the ejector. The lower section is provided at the screws with a fulcrum 78, consisting of a plate or piece provided with an upper rounded or convex face and adapted to permit the upper section of the bearing to rock on the lower section. The fulcrum may, however, be formed integral with the lower section, if desired. By adjusting the nuts of the bolts 74, the tension of the coiled springs 77 may be controlled, and the desired pressure may be produced on the sleeve of the ejector, which rotates with the head or form. The veneer is also held against the head or form by an exteriorly arranged spring actuated clamp 79, consisting of a plate or piece provided at one edge with a transversely disposed eye 80 to receive a rock shaft or rod 81, journaled in a suitable bearing 82 of an arm 83. The other edge of the clamp 79 is provided with notches 84 to clear the stapling devices, and the rock shaft or rod 81, which is arranged horizontally, has a coiled spring 85 disposed on it for yieldably connecting the clamp with the said rod or shaft 81. The outer end of the coiled spring is arranged in a recess 86 of the clamp 79, and the inner end of the spring engages a recess 87 of a collar 88, secured to the rod or shaft and provided with a set screw for clamping it in its adjustment. The collar 88 is adapted to be adjusted on the rod or shaft 81 to position the clamp 79 properly with relation to the head or form. The bearing arm 83 is mounted on the reciprocatory carriage and the rod or shaft, which forms the pivot or pintle of the clamp, is retained in the bearing 82 by means of an end collar 89 and an actuating arm 90. The actuating arm 90 depends from the shaft at the outer end of the bearing 82, and it is provided at its upper end with an eye, which is adjustably secured to the said rod or shaft 81 by means of a set screw. The collar 89, which is also adjustably secured to the rod or shaft 81 by means of a set screw 91, is provided with a peripheral recess 92, receiving a projection 93 of the bearing and forming opposite shoulders or stops for limiting the oscillatory movement of the rock shaft 81. The projection 93 consists of a pin fixed to an annular flange or enlargement 94 of the bearing 82.

When the carriage is in its initial position adjacent to the magazine, the exteriorly arranged veneer clamp 79 is elevated to substantially a horizontal position, as illustrated in Figs. 1 and 6 of the drawings. When the carriage moves away from the magazine, the lower end of the oscillatory arm 90 is held by a front reversing dog 95 until the said arm 90 assumes a slightly inclined position, that allows it to pass over the dog 95 onto a track 96, which retains the arm in an inclined position for holding the clamp yieldably in engagement with the veneer. The oscillation of the arm swings the clamp 79 downwardly into engagement with the veneer and places the spring under tension, which is maintained during the movement of the carriage from the magazine to the stapling devices. The track consists of a bar, arranged horizontally and secured to the front side of the frame of the machine, and the arm is of a length greater than the vertical distance between the rod or shaft and the track, so that when it is in engagement with the latter it will occupy an inclined position to one side or to the other of the vertical plane of the rod or shaft 81. When the head or form is at the limit of its rearward movement, as illustrated in Fig. 8 of the drawings, the arm 90 is carried beyond and is engaged by a rear reversing dog 97, which, when the carriage moves forwardly, holds the lower end of the arm 90 and reverses the same, so that the said arm 90 will lift the clamp 79 out of engagement with the veneer and will maintain the said clamp 79 in an elevated position during the return movement of the carriage. The ends 98 of the track are cut away or recessed to permit the dogs to extend beneath the terminals of the upper edge of the track, and each dog, which is normally arranged at an inclination, is provided at its lower end with an eye to receive a pin or pivot 99. The lower end of the dog extends beyond the eye and forms a heel 100, which is adapted to engage a stop 101. The stop 101 is arranged in the path of the heel and limits the upward swing of the dog. The upper portion of the dog is engaged by a spring 102, secured at its inner end to the dog at the lower edge thereof, and having its outer end supported by a pin or stud 103. The spring 102 is bowed upwardly, and the dog is adapted to be reversed without the outer end of the spring becoming disengaged from the stud or pin 103. As the reversing dogs extend above the plane of the track, they positively engage the arm 90 of the rock shaft and reverse the position of the same when the carriage is reversed.

The engaging portion of the interior gripping device is arranged in a vertical position, when the carriage is at the limit of its rearward movement, and the head or form is located beneath the stapling devices. The engaging edge of the exterior clamp 79 is then located above the interior gripping device, the recess 84 affording sufficient clearance to permit the veneer to be stapled without the stapling devices coming in contact with the exterior clamp 79. The interior gripping device is equipped with a pair of spaced clench blocks 104, and the head or form is provided with a clench block 105, located at a point diametrically opposite the recess 63 and arranged at the bottom of the head or form, when the latter is in position for stapling the veneer. The overlapped ends of the veneer are secured together by a pair of wire staples and the veneer is also secured at the bottom by a single staple, located opposite the upper staples. The winding of the veneer around the head or form produces a box body having walls composed of a plurality of plies or thicknesses of veneer, and the staples are arranged to secure the plies or thicknesses of two opposite walls of the box body, as clearly illustrated in Fig. 22 of the drawings. The plies or thicknesses of the other two walls are adapted to receive engaging portions of a bottom and cover, as described and claimed in an application filed by me Oct. 25, 1907, Serial No. 391,133. The clench blocks 104 and 105 are seated in recesses of the interior gripping member and the sections of the head or form. The gripping member, which carries the clench blocks, is located near the veneer receiving groove in order that the stapling may be done at that point, thereby making a box body with a minimum amount of lap and effecting a saving of material.

The head or form is locked against rotary movement during the stapling operation by means of a latch 106 and the stop 107, which are engaged by lugs 108 and 109 of the ejector. The latch 106 consists of a bolt, arranged within a casing or housing 110 and actuated by a coiled spring 111. The bolt, which is preferably rectangular in cross section, is provided with a reduced stem 112, which extends through the rear wall of the casing, as clearly illustrated in Fig. 7 of the drawings. The coiled spring, which is arranged on the stem, is interposed between the rear wall of the casing and the rear end of the body portion of the bolt, which normally projects beyond the casing, the projecting portion being beveled at the upper face and having a horizontal lower face. The lug 108, which coöperates with the latch 106, is substantially triangular, being provided with a beveled lower face or edge and having a horizontal upper face. The beveled edge of the lug 108 engages the beveled end of the bolt, which is forced inwardly to permit the said lug 108 to move downward to a point below the bolt. The spring 111 then throws the bolt into engagement with the lug 108, which locks the head or form against rotary movement in one direction. The lug 109 is provided with a horizontal lower face and engages the stop 107, which consists of a metallic plate, a cushioning piece 113 of leather, rubber, or other suitable material being arranged beneath the plate 107 to cushion the latter. The stop 107 and the lug 109 lock the head or form against rotary movement in the other direction. The latch 106 and the stop 107 are mounted on a bracket 114, secured to the frame of the machine near the rear end thereof.

When the direction of the carriage is reversed, the rotation of the shaft 46 carries the engaging portion of the interior gripping device from the rear wall of the recess 63 to the front wall thereof, the head or form during such movement remaining stationary with relation to the carriage and being carried by the latter out of engagement with the latch 106 and the stop 107. The forward non-rotary movement of the head or form disengages the lugs or projections from the said latch 106 and stop 107 and carries the said lugs clear of such locking devices before a rotary movement is imparted to the head or form. The exterior clamp 79 is also disengaged from the veneer by the reversal of the arm 90 through such forward movement of the carriage. The veneer body is then unclamped or released by the engaging devices prior to discharging the said veneer body from the head or form by the ejector, which is moved outwardly over the head or form during such return movement by the mechanism hereinafter described. The ejector, which is cylindrical, is open at the outer end to receive the head or form, and it is provided with an inner end wall, which is connected with the sleeve 49. The said ejector is provided at the outer edge of its periphery with inwardly extending radially arranged projections or fingers 115, and the head or form is provided with transverse peripheral grooves 116, which receive the projections or fingers. The projections or fingers engage the veneer body at the inner side edges thereof, and prevent the veneer body from becoming wedged between the head or form and the ejector, when the latter slides over the said head or form. One of the projections or fingers 115 is located at the recess 63, in order to engage the overlapped stapled edges of the veneer where the resistance is the greatest and where the veneer body is the strongest. The ejector, which is interlocked with the head or form by means of the peripheral grooves and the radial projections or fingers, is adapted to discharge the veneer body without liability of injuring the same. The veneer body is discharged by the ejector at a point between the stapling devices and the magazine, where the machine is clear of mechanism, and this will enable an automatic counter to be employed for counting the number of boxes.

The rearward movement of the carriage is limited by a buffer 116ª, consisting of a strip of rubber, or other suitable material, arranged in a groove of a channeled piece 117, which is mounted on an angle strip or bar 118. One of the flanges or wings of the angle strip 118 is secured to the back of the channeled strip, and the other flange or wing is arranged horizontally and is adjustably secured to the frame by means of screws 119, or other suitable fastening devices, suitable slots 120 being provided for permitting the buffer to be moved backward or forward, so as to position the head or form properly with relation to the stapling devices. Any other suitable means, however, may be provided for adjustably mounting the buffer on the frame of the machine.

The carriage is equipped with a pair of depending ears 121, formed integral with a plate or member 122, which is bolted, or otherwise secured to the lower faces of the front and rear sides of the carriage adjacent to the rear end thereof. The ears support a transverse bolt or pin 123, which carries an anti-friction device 124 and which pivots a pair of links 125 to the ears. The anti-friction roller is engaged by a rock arm 126, and the links, which extend between the ears, are connected at their front ends to an auxiliary rock arm 127. The rock arm 126, which is oscillated by an eccentric 128, is pivoted at its lower end to the frame of the machine by a transverse rod or shaft 129, and is provided at its upper end with a U-shaped engaging portion having front and rear sides 130 and 131 of unequal length. The sides are spaced apart to form a slot or opening to receive the anti-friction roller 124, and when the roller 124 is arranged within the opening or recess of the rock arm, the latter actuates the carriage. The lower end of the rock arm is fulcrumed at a point in advance of the center of the throw or distance traveled by the upper end of the rock arm, which causes the upper end of the rock arm to disengage the carriage at the rear end of the stroke, and which permits the rock arm to remain in engagement with the anti-friction roller of the carriage at the forward end of the stroke, while the carriage is at the magazine. When the carriage is in engagement with the buffer, the distance between the anti-friction roller 124 and the pivot 129 of the rock arm 126 is greater than the distance between the pivot of the rock arm 126 and the end of the short disengaging side 130 of the U-shaped portion, the excess of the former distance being just sufficient to permit the short side 130 of the upper end of the rock arm 126 to clear the anti-friction roller 124. The rock arm lets go of the carriage just prior to the carriage striking the buffer, so that the friction incident to the sliding of the carriage, together with the action of a lower yieldable connection between the rock arm 126 and the auxiliary rock arm 127 operate to cushion the carriage and prevent jar or shock when the same strikes the buffer. The front ends of the links 125 are pivoted to the upper end of the auxiliary rock arm 127, which is provided at the lower end with an angular extension 132, having a terminal perforation to receive the pivot shaft or rod 129, and offsetting the auxiliary rock arm from the actuating rock arm 126. The auxiliary rock arm is connected with the actuating rock arm by the said yieldable connection, consisting of a tension device composed of a coiled spring 133 and a rod 134. The rod 134, which extends through an aperture 135 of the auxiliary rock arm, is pivoted at its rear end 136 to the rock arm 126 and its front portion receives the coiled spring, which is interposed between the front edge of the auxiliary rock arm and an adjustable head 137 of the rod. The front end 138 of the rod is threaded for the reception of a pair of nuts 139, which are adjustable to vary the tension of the spring. The head 137, which consists of a disk, fits against one of the nuts 139 and the other nut operates as a lock or jam nut for securing the first mentioned nut in its adjustment. The lower yieldable connection between the rock arm 126 and the auxiliary rock arm is also provided with a tubular casing 140, receiving the coiled spring, and the adjacent portion of the rod is provided with a threaded end 141, which engages a threaded opening of an attaching plate 142. The attaching plate 142 is bolted, or otherwise secured to the auxiliary rock arm. When the actuating rock arm 126 disengages itself from the carriage, it is still connected with the same through the yieldable connection between it and the auxiliary rock arm, and the tension of the spring 133 gradually increases when the carriage engages the buffer and the rock arm 126 moves away from the auxiliary rock arm 127. The tension of the spring 133 holds the carriage firmly against the buffer, and maintains the lugs 108 and 109 in engagement with the locking devices 106 and 107 during the stapling operation. This prevents any accidental backward movement of the head or form while the veneer is being stapled. The links 125 are connected at an intermediate point to the said ears 121, and their rear portions, which project beyond the ears, are located at opposite sides of and form a guide for the upper end of the rock arm 126, when the latter disengages itself from the carriage. The upper end of the rock arm 126 carries a finger 143, extending upwardly and forwardly from the short side 130 of the U-shaped portion of the rock arm 126, and pivoted to the same in a bifurcation thereof by means of a pin 144, or other suitable fastening device. The finger, which is inclined, tapers upwardly, and its lower end is reduced to fit in the bifurcation of the short side 130, as clearly illustrated in Fig. 18 of the drawings. The finger 143 is normally supported in an inclined position by means of a coiled spring 145, mounted on a lug or projection 146 of the rock arm 126. The lug or projection 146 extends horizontally from the rock arm 126, and is provided in its upper face with a seat to receive the lower end of the coiled spring 145. The upper end of the coiled spring is also fitted in a recess of the lower edge of the finger 143. The finger remains in contact with the anti-friction roller 124, when the rock arm leaves the same and it assists in guiding the rock arm into engagement with the said anti-friction device.

When the rock arm 126 moves forwardly, the spring 133 gradually relaxes and the said rock arm 126 engages an upper cushioning device, comprising a coiled spring 146$^a$ and a rod 147, guided in a perforation 148 of the auxiliary rock arm and in a perforation 149 of an adjustable casing or housing for the coiled spring. The adjustable casing or housing is composed of two adjustable sections 150 and 151, the section 151 being in the form of a cap and forming a bearing for one end of the coiled spring 146. The cap is interiorly threaded to receive the tubular section 150, which is exteriorly threaded to engage the interior screw threads of the cap and also the interior screw threads of an attaching plate 152, constructed similar to the attachment plate 142, heretofore described, and bolted or otherwise secured to the auxiliary rock arm. The rod 147 is provided at an intermediate point with a head 153, located at the front edge of the auxiliary rock arm and forming a bearing for the rear end of the cushioning spring 146. The rock arm 126 engages the rod 147 before the U-shaped upper end reaches the anti-friction roller 124, and the carriage is thereby cushioned and is changed from rest to motion without jar or shock. The upper cushion prevents the rock arm from hammering the carriage when it reengages the anti-friction roller, and the tension of the spring may be varied by adjusting the cap 151 of the tubular casing. It has been found by experience that while the machine without the cushioning devices could only be operated at a very low rate of speed, say about eight revolutions a minute, with the cushioning devices it may be run at a very high rate of speed, varying from thirty to sixty revolutions a minute, without hammering or jarring the machine. The lower yieldable connection forms a cushioning device for enabling the carriage to stop without jar, and the force of the lower spring gradually decreases as the force of the upper spring, which enables the carriage to be put in motion without jar, increases. The forward movement of the carriage is not sufficient to disengage the short side 130 from the anti-friction roller, and the rock arm 126 is positively engaged with the carriage through the anti-friction roller, when the said carriage is at the limit of its forward movement.

The ejector is operated during the return movement of the carriage by means of a cam guide 154 and a projecting stud or member 155, consisting of an anti-friction roller, operating in the said guide. The anti-friction roller, which is mounted on a screw 156, or other suitable fastening device, is secured by the same to the lower face of the slide 44, which is provided with an upwardly extending portion or arm 157, having an opening to receive the sleeve 49. The sleeve 49 is provided at one side of the arm 157 with an integral flange 158, and its inner end 159 is threaded at the opposite side of the arm 157 for the reception of a pair of nuts 160. The nuts, which are circular, are adapted to be turned by a spanner, or other suitable tool, and one of the nuts operates as a jam or lock nut in the ordinary manner. When the slide 44 is moved laterally, as hereinafter explained, it carries with it the sleeve 49 and the ejector 45. The cam guide 154, which is supported by a longitudinal bar 161, is composed of a substantially triangular frame 162, an inner fixed triangular guiding member 163, and a pivoted inner guiding member 164. The longitudinal supporting bar 161, which is bolted or otherwise secured at its ends to the frame of the machine, has one of its side edges located near the median line of the same, and it is provided near its ends with off-sets or bends 165, which drop the body portion of the bar below the upper faces of the front and rear upper end pieces 166 to which the bar 161 is secured. The depressed body portion of the bar supports the cam guide, so that it will lie clear of the carriage and assist in supporting the slide 44, which rests upon the cam guide. The triangular frame 162, which is provided with front and rear end loops 167, consists of a long straight side and short angularly disposed sides 168 and 169. The apex or angle formed by the angularly disposed sides 168 and 169 is arranged midway between the end loops 167. The fixed inner guiding member 162, which is spaced from the opposite sides of the frame to form grooves or ways, extends forwardly from the center of the guide, and it has a diagonally disposed edge, arranged in parallelism with the angularly disposed side 168, which has a straight inner edge. The other side edge of the inner fixed guiding member 162 is disposed longitudinally, and is arranged in parallelism with the longitudinal side of the frame to form a straight longitudinal way.

The rear end of the fixed guiding member 162 extends slightly beyond the center of the frame, and is provided with a recess, which receives the front pivoted end of the movable guiding member or switch 164. The movable guiding member, which is tapered rearwardly, is normally maintained in contact with the long longitudinally disposed side of the frame 162 by means of a spring 170, and when in this position its side edge adjacent to the angularly disposed side 169 is arranged in parallelism with the same to form a diagonally arranged way for moving the ejector outward. The front pivoted end of the guiding member 164 is rounded to fit the recess 171 of the fixed guiding member, and it is secured to a vertical pivot 172, extending through a perforation of the supporting bar 161 and provided at its lower end with an arm 173 to which one end of the coiled spring 170 is connected. The other end of the spring is attached to the supporting bar 161 by means of a pin 174, or other suitable fastening device. The pivoted guiding member or switch, which is arranged between the opposite sides of the triangular frame, is movable from one side to the other, and its point or rear end is adapted to fit against the rear terminal of the diagonally arranged side 169, as illustrated in Fig. 20 of the drawings, to permit the anti-friction roller 155 to pass it. When the anti-friction roller 155 is carried rearwardly in the cam way, it moves in a straight line from the front end of the front loop to the rear end of the rear loop 167. During the latter portion of this movement, the anti-friction roller 155 engages the pivoted guiding member or switch 164, and swings the same toward the angularly disposed diagonally arranged side 169 and passes it. As soon as the roller 155 passes the point of the pivoted guiding member or switch, the latter is automatically returned to its normal position by means of the spring 170, and it closes the rear end of the straight longitudinal groove or way to cause the anti-friction roller 155, after it leaves the rear loop 167, to move forwardly through the rear diagonally arranged groove or way 175. When the carriage moves forwardly on its return movement after the stapling operation has been completed, the anti-friction roller of the slide first moves along the longitudinally disposed rear loop 167, and is held against lateral movement by the same until the veneer box body is released by both the interiorly arranged gripping device and the exterior clamp 79. The roller then engages the angularly disposed pivoted guiding member or switch 164, and is caused to move diagonally of the machine through the rear angularly disposed groove or way 175 to the central portion of the cam guide. This moves the ejector outwardly to the position illustrated in Fig. 20 of the drawings, and discharges the box body from the head or form. The continued forward movement of the carriage carries the anti-friction roller 155 into the front diagonally arranged groove or way 176, which returns the ejector to its initial position with relation to the head or form. The resistance incident to the lateral movement of the ejector and the action of the friction device, which engages the sleeve of the ejector, tends to subject the shaft 46 to a rearward lateral torsional strain, which is resisted by the rear portion of the guide 44. The rear portion of the guide 44 slides on the rear side of the frame of the carriage, which receives the end thrust of the slide and thereby relieves the shaft 46 of strain. The front portion of the guide 44, extending from the shaft 46 to the front side of the carriage, may be omitted without impairing the strength of the machine, but a more perfect guiding of the slide is secured by constructing the same to slide on both the front and rear sides of the frame of the carriage. The ejector is moved inwardly to its initial position before the veneer is fed to the head or form, and the straight longitudinally disposed groove or way of the front loop 167 maintains the ejector in proper position at the inner side of the head or form, and prevents any lateral movement of the ejector while the veneer is being fed into the groove and is being bowed or buckled in the manner heretofore described. This enables the outer edge of the ejector to operate as a guide for the inner side edge of the veneer, and it will enable the said veneer to be wound straight or accurately on the said head or form. In practice, the outer edge of the ejector will have a slight bevel 177 for guiding the veneer into engagement with the straight portion of the outer edge of the ejector, and the outer portion of the spring actuated clamp in practice will be slightly lower than the inner portion, so as to cause the said outer portion to engage the veneer in advance of the inner portion, whereby the veneer will be pressed inwardly in the direction of the guiding edge of the ejector. The ejector forms a rotary guide for the veneer as it turns with the head or form, and it prevents a straight guiding edge to the veneer until the same is entirely wound on the head or form. The guiding means, by rotating with the head or form, does not offer the resistance to the feeding of the veneer, which would necessarily be incident to a relatively fixed guide.

The front terminal of the rear diagonally arranged guiding groove or member is arranged at the apex of the frame of the cam guide, and at the central portion of the machine. This causes the stapled veneer to be ejected at a point between the stapling devices and the magazine, where the machine is clear of mechanism. The veneer body is made with one stroke of the carriage and the ejecting is effected on the return stroke, which, after the veneer body is ejected, serves to engage the head or form with the sheet of veneer held by the suction devices and produces the buckling or bowing of the veneer.

The rock arm 126 is connected with the eccentric 128 by an adjustable connecting rod 178, which may be of any preferred construction, and the eccentric is counterbalanced by a weight 179, mounted on the transverse shaft 180, which carries the eccentric 128. The weight 179 extends from the shaft 180 in the opposite direction from the eccentric 128, as clearly illustrated in Fig. 3 of the drawings, and it renders the rotary movement of the eccentric uniform and free of vibration. The transverse shaft 180 also carries a pair of reversely arranged eccentrics 181 and 182, which are connected with the upper and lower stapling devices for operating the same. These eccentrics 181 and 182 are so timed that they will operate the stapling devices to fasten the veneer, when the head or form has reached the limit of its rearward movement and has been locked in such position, so that the clench blocks will be firmly held in position to coöperate with the upper and lower stapling devices.

Motion is communicated to the shaft 180 from a countershaft 183, carrying a pinion 184, which meshes with a gear wheel 185, keyed or otherwise secured to the transverse shaft 180. The counter-shaft 183 is also equipped with a pulley 186 on which is arranged a belt 187, extending downwardly through the floor and connected with a suitable driving pulley. The machine will ordinarily be arranged on the upper floor of a factory, but, of course, the driving belt, or other operating mechanism may be arranged in any desired manner to suit the position of the machine.

The machine is thrown into and out of operation by means of a suitable clutch 188, slidably interlocked with the counter-shaft and arranged to engage the power pulley 186. The clutch is operated by a shifter consisting of a shaft 189, provided at one end with a loop-shaped arm 190 depending from the shaft and arranged in an annular groove of the clutch 188. The other end of the shaft 189 is provided with an operating arm 191, disposed transversely of the machine and extending to a point beneath the magazine. Any other suitable means, however, may be employed for starting and stopping the machine.

Having thus fully described my invention, what I claim as new and desire to secure by Letters Patent, is:—

1. The method of making rectangular veneer boxes on a round form, which consists in scoring a strip of veneer at intervals corresponding with the corners of the box, then winding the strip on a round form, and fastening the veneer while on the form, the resiliency of the material and the scoring causing the fastened veneer to assume a rectangular shape when removed from the form.

2. The method of making rectangular veneer boxes on a round form, which consists in scoring a strip of veneer at intervals corresponding with the corners of the box, then winding the strip on a round form, and stapling the veneer at points between the scoring while on the form, the resiliency of the material and the scoring causing the fastened veneer to assume a rectangular shape when removed from the form.

3. The method of making rectangular veneer boxes on a round form, which consists in scoring a strip of veneer transversely at intervals corresponding with the corners of the box, feeding the strip to a round form, rotating the latter to wind the strip thereon, stapling the veneer between the scorings while it is on the form, and ejecting it from the latter to cause the veneer through its resiliency and the scoring to assume a rectangular shape.

4. In a veneer box making machine, the combination with a round form, of means for supplying veneer to such form, means for clamping the veneer interiorly and exteriorly of the form, means for rotating the form to wind the veneer thereon, and means spaced from the veneer supplying means for stapling the veneer while the same is on the form, said form being also reciprocatable to carry it backward and forward between the veneer supplying means and the stapling means.

5. In a veneer box making machine, the combination with a round form, of means for supplying veneer to such round form, means for clamping the veneer interiorly and exteriorly of the form, means for rotating the form for winding the veneer on the same, means spaced from the supplying means for stapling the veneer on the form, said form being reciprocated back and forth between the veneer supplying means and the stapling means, means for releasing the veneer after the same has been stapled, and means for ejecting the veneer during the movement of the form from the stapling means to the supplying means.

6. In a veneer box making machine, the combination with a round form, of means for supplying veneer to such form, means for winding it thereon, means for stapling the veneer while it is on the form to make a box body, said supplying means and stapling means being spaced apart, and the said form being movable back and forth between the same.

7. In a veneer box making machine, the combination with a round form, of means for supplying veneer to such form, means for winding it thereon, means for stapling the veneer while it is on the form to make a box body, said veneer supplying means and stapling means being spaced apart, and the said form being movable back and forth between the same, and means for ejecting the veneer body from the form at an intermediate point between the veneer supplying and stapling means.

8. In a veneer box making machine, the combination with a round form, of means for supplying veneer to the round form, means for imparting rotary and reciprocatory motions to the round form to wind the veneer thereon and to draw the same from the supplying means, and means spaced from the supplying means for stapling the veneer to form a box body while the veneer is on the said form.

9. In a veneer box making machine, the combination with a round form, of means for supplying veneer to the round form, means for imparting rotary and reciprocatory motions to the round form to wind the veneer thereon and to draw the same from the feeding means, stapling mechanism spaced from the veneer supplying means for stapling the veneer while it is on the form, and an ejector for removing the veneer body from the form, said ejector being operated while the form is in the space between the stapling mechanism and the veneer supplying means.

10. In a veneer box making machine, the combination with a round form, of means for supplying veneer to such form, means for imparting reciprocatory and rotary motions to the round form to wind the veneer thereon and to withdraw the same from the veneer supplying means, interiorly and exteriorly arranged means for engaging the veneer to clamp the same to the form, means spaced from the veneer supplying means for stapling the veneer to make a box body, means for releasing the veneer from the clamping device after the veneer has been stapled, and means for ejecting the released body from the form at an intermediate point between the veneer supplying means and the stapling means.

11. In a veneer box making machine, the combination with a round form, of means for supplying veneer to such form, means for imparting reciprocatory and rotary motions to the round form to wind the veneer thereon and to withdraw the same from the veneer supplying means, interiorly and exteriorly arranged means for engaging the veneer to clamp the same to the form, means spaced from the veneer supplying means for stapling the veneer to make a box body, means for releasing the veneer from the clamping device after the veneer has been stapled, and means for ejecting the released body from the form at an intermediate point between the stapling means and the veneer supplying means.

12. In a veneer box making machine, the combination with a round form, of means for supplying the same with veneer, means for winding the veneer on the form, stapling means spaced from the veneer supplying means for securing the veneer while the same is on the form, said form being movable backwardly and forwardly between the veneer supplying means and the stapling means, and means for ejecting the stapled veneer at an intermediate point between the stapling means and the veneer supplying means.

13. In a veneer box making machine, the combination with veneer supplying mechanism including means movable vertically to lift a sheet of veneer from the top of a stack or pile and for holding the same, of a round form provided with veneer engaging means, and means for rotating the form and for reciprocating the same transversely of the axis of rotation to engage the form with the sheet of veneer and to wind the sheet of veneer around the form and to withdraw the veneer from the holding means.

14. In a veneer box making machine, the combination with veneer supplying mechanism including means for lifting a sheet of veneer from the top of a stack or pile, and a fixed suction device for holding the sheet, of a form provided with means for clamping the veneer, and means for rotating the form and for reciprocating the same transversely of the axis of rotation to engage the form with the sheet of veneer and to wind the same on the form, the reciprocatory motion of the form being away from the source of supply from the time it has received the sheet or blank.

15. In a veneer box making machine, the combination with veneer supplying means including a movable suction device arranged to lift a sheet of veneer from the top of a pile or stack, and a fixed suction device arranged to hold the said sheet of veneer, a form, means for imparting reciprocatory and rotary motions to the form to engage the same with the veneer and to wind the latter around the form, and means for holding the veneer on the form.

16. In a veneer box making machine, the combination with veneer supplying mechanism provided with means for holding a sheet of veneer, a form provided with a veneer-engaging portion and having gripping means located adjacent to and coöperating with the said portion for clamping the veneer, means for imparting reciprocatory and rotary motions to the form to carry the same into engagement with the veneer and to wind the veneer around the form, the reciprocatory movement of the form being sufficient to buckle and bow the veneer, whereby the latter is retained in engagement with the form until it is engaged by the gripping means.

17. In a veneer box making machine, the combination with veneer supplying mechanism provided with means for holding a sheet of veneer, a form provided with a veneer-receiving portion, means for imparting reciprocatory and rotary motions to the form to carry the same to and from the veneer supplying means and to wind the veneer around the form, the movement in the direction of the veneer supplying means being sufficient to engage the form with the veneer and buckle the latter, and means for clamping the veneer on the form, the latter means being carried into engagement with the veneer during the movement of the form from the veneer supplying means and the buckling of the veneer serving to retain the same in engagement with the form until it is held by the clamping means.

18. In a veneer box making machine, the combination with veneer supplying mechanism provided with means for holding a sheet of veneer, a form having a veneer-receiving groove, means for imparting reciprocatory motion to the form to carry the same toward and from the veneer supplying mechanism and to engage the sheet of veneer with the groove of the form, the movement toward the veneer supplying mechanism being sufficient to buckle the veneer, means operable during the movement of the form from the veneer supplying means to clamp the veneer in the groove, the buckling of the veneer operating to retain the same in the groove until it is engaged by the clamping means, and means for winding the veneer on the form.

19. In a veneer box making machine, the combination of veneer supplying mechanism provided with means for holding a sheet of veneer, a form, and means for moving the form toward the sheet to engage the same and for reversing the movement to carry the form and the sheet away from the supplying means and for simultaneously rotating the form to wind the sheet around the same, the latter means including a fixed rack, and a pinion meshing with the rack and reciprocating the form and connected with the same to impart the said rotary movement thereto.

20. In a veneer box making machine, the combination of veneer supplying mechanism provided with means for holding a sheet of veneer, a form, and means for moving the form to the veneer supplying means to engage the sheet and for reversing the movement of the form to carry the same and the sheet away from the veneer supplying means and for rotating the form to wind the sheet thereon, the latter means including a fixed rack, a reciprocatory carriage, a shaft mounted on the carriage and connected with the form, and a pinion carried by the shaft and meshing with the rack.

21. In a veneer box making machine, the combination with supplying mechanism provided with means for holding a sheet of veneer, of a reciprocatory carriage, a shaft mounted on the carriage and provided with a pinion, a fixed rack meshing with the pinion to impart rotary motion to the shaft when the carriage is reciprocated, a form mounted on the shaft and carried to the veneer supplying means to engage the sheet and being moved from the veneer supplying means to withdraw the sheet therefrom, said form being rotated to wind the veneer on it, and gripping means connected with the shaft and operated by the reciprocation of the carriage to engage and release the veneer.

22. In a veneer box making machine, the combination with veneer supplying mechanism provided with means for holding a sheet of veneer, of a shaft, means for imparting reciprocatory and rotary motions to the shaft, a form mounted on the shaft and carried by the same to the veneer supplying means to engage the sheet and movable backwardly to withdraw the sheet therefrom and rotated for winding the veneer on it, a gripping member mounted on the form and arranged to engage the veneer, and connections between the gripping member and the shaft for moving the same into and out of engagement with the veneer.

23. In a veneer box making machine, the combination of veneer supplying mechanism provided with means for holding a sheet of veneer, a shaft, a form mounted on the shaft and carried by the same, a gripping member mounted on the form and arranged to engage the veneer, an arm fixed to the shaft and connected with the gripping member for moving the same into and out of engagement with the veneer to grip and release the same, and means for imparting reciprocatory and rotary motions to the shaft to engage the form with the sheet and to move the form backward to withdraw the sheet from the veneer supplying mechanism.

24. In a veneer box making machine, the combination of veneer supplying mechanism, a shaft, a form mounted on the shaft and adapted to have a sheet of veneer wound around it, a gripping member mounted on the form and movable into and out of engagement with the veneer and arranged to actuate the said form and movable independently thereof to permit the form to remain stationary with relation to the shaft while the veneer is being gripped and released, an arm fixed to the shaft, means for connecting the gripping member with the arm, and means for imparting reciprocatory and rotary motions to the shaft to carry the form to the veneer supplying mechanism to engage the sheet and to move the form backward to withdraw the sheet from the said mechanism.

25. In a veneer box making machine, the combination of veneer supplying mechanism, a shaft, a form mounted on the shaft and provided with a recess and adapted to have a sheet of veneer wound around it, a gripping member operative in the recess and movable toward and from the opposite walls thereof to engage and release the veneer and also to impart a rotary motion to the form, said form being stationary with relation to the shaft during the movement of the gripping device from one side of the recess to the other and while the veneer is being engaged and released by the same, an arm mounted on the shaft and connected with the gripping member, and means for imparting rotary and reciprocatory motions to the shaft to carry the form to the veneer supplying mechanism and to move the form backward to withdraw a sheet therefrom.

26. In a veneer box making machine, the combination of veneer supplying mechanism having means for holding a sheet of veneer in a fixed position, a shaft, a form mounted on the shaft and adapted to have the sheet of veneer wound around it, an oscillatory gripping member eccentrically pivoted to the form and movable into and out of engagement with the veneer, arms located at opposite sides of the form and fixed to the shaft, a pin extending through the form and connected with the arms and with the gripping member, and means for imparting reciprocatory and rotary motions to the shaft to carry the form into engagement with the sheet of veneer and to move the form backward to withdraw the sheet from the veneer supplying mechanism.

27. In a veneer box making machine, the combination of veneer supplying mechanism including means for holding a sheet of veneer in a fixed position, a shaft, a form mounted on the shaft and provided with an arcuate slot, said form being also adapted to have the sheet of veneer wound around it, a gripping member eccentrically pivoted to the form at a point diametrically opposite the said slot and provided at an intermediate point between the pivot and the slot with a gripping portion movable into and out of engagement with the veneer, arms fixed to the shaft at opposite sides of the form, a transverse pin connected with the arms and with the gripping member and extending through and operable with the said slot, and means for imparting reciprocatory and rotary motions to the shaft to carry the form into engagement with the sheet of veneer and to move the form backward to withdraw the sheet from the veneer supplying mechanism.

28. In a veneer box making machine, the combination of veneer supplying mechanism including means for holding a sheet of veneer in a fixed position, a shaft, a form mounted on the shaft and composed of sections provided at their inner and outer faces with recesses, the inner recess forming an interior chamber, said form being also provided with a transverse recess, a gripping member consisting of a transverse engaging portion located within the recess, and a web or stem located within the interior chamber and eccentrically pivoted to the form, arms fixed to the shaft and located within the outer recess of the said sections, a transverse pin extending through the sections and connecting the arms and the gripping member, and means for imparting reciprocatory and rotary motions to the shaft to carry the form into engagement with the sheet of veneer and to move the form backward to withdraw the sheet from the veneer supplying mechanism.

29. In a veneer box making machine, the combination with veneer supplying mechanism, of a form, means for imparting reciprocatory and rotary motions to the form to engage the same with the veneer and to wind the latter around the form, a gripping member mounted on the form for engaging the veneer, clench blocks mounted on the gripping member and on the form and located at diametrically opposite points when the gripping member is in engagement with the veneer, and means coöperating with the clench blocks for stapling the veneer.

30. In a veneer box making machine, the combination with veneer supplying means, of a form, means for imparting rotary and reciprocatory motions to the form to carry the same to the veneer supplying means to engage the veneer and to move the same backward from the veneer supplying means to withdraw a sheet therefrom and to wind the veneer around the form, a clamp for engaging the veneer exteriorly of the form, and means for automatically carrying the clamp into engagement with the veneer when the form moves away from the gripping means and for automatically releasing the veneer when the form moves toward the said supplying means.

31. In a veneer box making machine, the combination with veneer supplying means, of a form, means for imparting rotary and reciprocatory motions to the same to carry the form to the veneer supplying means to engage the veneer and to move the form backward away from the veneer supplying means to withdraw the sheet therefrom and to wind the veneer around the form, and a spring-controlled clamp yieldably engaging the veneer exteriorly of the form and automatically movable into and out of engagement with the veneer.

32. In a veneer box making machine, the combination with veneer supplying means, of a form, means for imparting rotary and reciprocatory motions to the form to carry the same to the veneer supplying means to engage the veneer and to move the same backward from the veneer supplying means to withdraw the sheet therefrom and to wind the veneer around the form, a clamp arranged to engage the veneer exteriorly of the form, an oscillatory arm connected with the clamp, and means arranged in the path of the arm for engaging the same to maintain the clamp in engagement with the veneer when the form moves away from the veneer supplying means and out of engagement with the veneer when the form moves toward the said means.

33. In a veneer box making machine, the combination with veneer supplying means, of a form, means for imparting rotary and reciprocatory motions to the same to carry the form to the veneer supplying means to engage the veneer and to move the form backward away from the veneer supplying means to withdraw the sheet therefrom and to wind the veneer around the form, a clamp arranged to engage the veneer exteriorly of the form, an oscillatory arm connected with the clamp, means arranged in the path of the arm for engaging the same to maintain the clamp in engagement with the veneer when the form moves away from the veneer supplying means and out of engagement with the veneer when the form moves toward such means, and means for reversing the position of the arm at the end of each backward and forward movement of the form.

34. In a veneer box making machine, the combination with veneer supplying means, of a form, means for imparting rotary and reciprocatory motions to the form to carry the same to the veneer supplying means to engage the veneer and to move the form backward and away from the veneer supplying means to withdraw the sheet therefrom and to wind the veneer around the form, a clamp engaging the veneer exteriorly of the form, an oscillatory arm connected with the clamp, a fixed track arranged to be engaged by the arm for maintaining the clamp in engagement with the veneer when the form moves away from the veneer supplying means and for holding the clamp out of engagement with the veneer when the form moves toward the veneer supplying means.

35. In a veneer box making machine, the combination with veneer supplying means, of a form, means for imparting rotary and reciprocatory motions to the same to carry the form to and from the veneer supplying means and to wind the veneer around the form, a clamp arranged to engage the veneer exteriorly of the form, an oscillatory arm connected with the clamp, a fixed track arranged to be engaged by the arm for maintaining the clamp in engagement with the veneer when the form moves away from the veneer supplying means and for holding the clamp out of engagement with the veneer when the form moves toward the veneer supplying means, and dogs located at the ends of the track for reversing the position of the arm.

36. In a veneer box making machine, the combination with veneer supplying means, of a form, means for imparting reciprocatory and rotary motion to the form to move the same to and from the veneer supplying means and to wind the veneer around the form, a pivoted clamp arranged to engage the veneer and provided with an arm, a horizontal track arranged in the path of the arm and spaced from the pivot of the clamp, the distance between the pivot of the clamp and the track being less than the length of the arm, and reversing dogs located at the ends of the track and extending above the same and arranged to engage the arm for changing the position thereof with relation to the track.

37. In a veneer box making machine, the combination with veneer supplying means, of a form, means for imparting reciprocatory and rotary motions to the form to move the same to and from the veneer supplying means and to wind the veneer around the form, a pivoted clamp arranged to engage the veneer and provided with an arm, a horizontal track arranged in the path of the arm and spaced from the pivot of the clamp, the distance between the pivot of the clamp and the track being less than the length of the arm, inclined reversing dogs pivotally mounted at the ends of the track and extending above the same and arranged to be depressed by the said arm and adapted also to engage the same to reverse the position thereof with relation to the track, springs for holding the dogs normally in an inclined position, and stops for limiting the movement of the dogs in one direction.

38. In a veneer box making machine, the combination with veneer supplying means, of a reciprocatory carriage, a form mounted on the carriage and carried to the veneer supplying means to engage the veneer and backward therefrom to withdraw a sheet of veneer, means for rotating the form for winding the veneer thereon, a horizontal rod or shaft journaled on the carriage, a clamp mounted on the rod or shaft and arranged to engage the veneer, a spring connected with the rod or shaft and with the clamp, an arm also connected with the rod or shaft, and means located in the path of the arm for operating the shaft to carry the clamp into and out of engagement with the veneer.

39. In a veneer box making machine, the combination with veneer supplying mechanism, of a form, means for imparting rotary and reciprocatory motions to the form to carry the same to and from the veneer supplying means and for winding a sheet of veneer around the form, means spaced from the veneer supplying means for stapling the veneer, and means for locking the form against rotary motion in either direction during the stapling operation.

40. In a veneer box making machine, the combination with veneer supplying mechanism, of a form, means for imparting rotary and reciprocatory motions to the form to carry the same to and from the veneer supplying means and for winding a sheet of veneer around the form, means spaced from the veneer supplying means for stapling the veneer, lugs carried by the form, a stop arranged to be engaged by one of the lugs, and a movable latch for engaging the other lug, said lugs being carried out of engagement with the stop and the latch by the reciprocatory motion of the form.

41. In a veneer box making machine, the combination with veneer supplying mechanism, of a form, means for imparting rotary and reciprocatory motions to the form to carry the same to and from the veneer supplying means and for winding a sheet of veneer around the form, means spaced from the veneer supplying means for stapling the veneer, lugs carried by the form, a cushioned stop arranged to be engaged by one of the lugs, and a latch consisting of a spring actuating bolt arranged to engage the other lug.

42. In a veneer box making machine, the combination with veneer supplying means, of a reciprocatory carriage, a shaft mounted on the carriage, means for rotating the shaft when the carriage is reciprocated, a form mounted on the shaft and carried to the veneer supplying means to engage the veneer and move backward to withdraw a sheet of veneer from the said veneer supplying means, a gripping device mounted on the form and connected with the shaft and movable independently of the form to engage and release the veneer, said form being stationary with relation to the shaft during such independent movement of the gripping device, and locking devices arranged in the path of the form for holding the same against rotary movement in either direction at one end of the reciprocatory movement of the carriage while the veneer is being fastened, said form being disengaged from the locking devices while it is stationary with relation to the shaft.

43. In a veneer box making machine, the combination with veneer supplying means, of a form, means for imparting reciprocatory and rotary motions to the form to carry the same to the veneer supplying means to engage it with the veneer and to move it backward from the veneer supplying means to withdraw a sheet therefrom and for winding the sheet of veneer around the form, and an ejector movable with the form and arranged to slide the veneer off the same at an intermediate point between the limits of movement of the form.

44. In a veneer box making machine, the combination with veneer supplying means, of a form, means for imparting reciprocatory and rotary motions to the form to carry the same to the veneer supplying means to engage it with the veneer and backward therefrom to withdraw a sheet from the veneer supplying means and for winding a sheet of veneer around the form, and an ejector movable with the form and arranged to slide the veneer off the same during the return movement of the form, said ejector being also arranged to guide the veneer while the same is being wound around the form.

45. In a veneer box making machine, the combination with veneer supplying means, of a form, means for imparting reciprocatory and rotary motions to the form to carry the same to the veneer supplying means to engage it with the veneer and backward from the veneer supplying means to withdraw a sheet therefrom and for winding a sheet of veneer around the form, and an ejector movable with and telescoping over the form to slide the veneer therefrom and forming a guide for the veneer.

46. In a veneer box making machine, the combination with veneer supplying means, of a form, means for imparting reciprocatory and rotary motions to the form to carry the same to the veneer supplying means to engage the veneer and backward therefrom to withdraw a sheet from the veneer supplying means and for winding a sheet of veneer around the form, and an ejector telescoping over the form for sliding the veneer therefrom, said ejector being provided with a guiding edge and constituting a rotary guide for the veneer while the same is being wound on the form.

47. In a veneer box making machine, the combination of a round form, means for supplying veneer to the same, means for winding it thereon, and a cylindrical telescopic ejector slidable over the form to remove the veneer therefrom and rotating therewith.

48. In a veneer box making machine, the combination of a form provided with transverse grooves, means for supplying veneer to the form, means for winding it thereon, an ejector slidable over and rotatable with the form and provided with projections or fingers operating in the grooves and engaging the veneer, and fixed angularly related means located in the path of the ejector for actuating the same.

49. In a veneer box making machine, the combination of a form, means for supplying veneer to the same, means for winding the veneer on the form, means for stapling the veneer, an ejecting device rotatable with and slidable over the form for removing the veneer and provided with inwardly extending projections or fingers to engage the veneer, one of the projections or fingers being located at the stapled portions of the veneer, and fixed angularly related means located in the path of the ejector for operating the same.

50. In a veneer box making machine, the combination of a form provided with transverse peripheral grooves and having a transverse recess, a gripping device operating in the recess to engage the veneer, means for feeding the veneer to the form, means for winding the veneer around the form, means for stapling the veneer while on the form, an ejector slidable over the form and provided with inwardly extending projections or fingers operating in the said grooves and in the recess to engage the veneer for sliding the same from the form, and fixed angularly related means located in the path of the ejector for actuating the same.

51. In a veneer box making machine, the combination with veneer supplying means, of a form, means for imparting reciprocatory and rotary motions to the form to carry the same to the veneer supplying means to engage the veneer and backward therefrom to withdraw a sheet from the veneer supplying means and to wind the veneer on the form, an ejector movable with the form and slidable transversely thereof to discharge the veneer, and means including a cam guide for sliding the ejector inwardly and outwardly during one of the reciprocatory movements.

52. In a veneer box making machine, the combination with veneer supplying means, of a form, means for imparting reciprocatory and rotary motions to the form to carry the same to the veneer supplying means to engage the veneer and backward therefrom to withdraw a sheet from the veneer supplying means and to wind the veneer on the form, an ejector movable with the form and slidable transversely thereof to discharge the veneer, and means including a cam guide having a longitudinal way for maintaining the ejector at the limit of its inward movement while the form is moving away from the veneer supplying means, said guide being also provided with opposite angularly disposed portions for moving the ejector outwardly and inwardly while the form is moving toward the veneer supplying means.

53. In a veneer box making machine, the combination with veneer supplying means, of a form, means for imparting reciprocatory and rotary motions to the form to carry the same to the veneer supplying means to engage the veneer and backward therefrom to withdraw a sheet from the veneer supplying means and to wind the veneer on the form, an ejector movable with the form and slidable transversely thereof to discharge the veneer, and means including a cam guide having diagonally arranged ways for moving the ejector outwardly and inwardly while the form is moving toward the feeding means.

54. In a veneer box making machine, the combination with veneer supplying means, of a form, means for imparting reciprocatory and rotary motions to the form to carry the same to the veneer supplying means to engage the veneer and backward therefrom to withdraw a sheet from the veneer supplying means and to wind the veneer on the form, an ejector movable with the form and slidable transversely thereof to discharge the veneer, and means including a cam guide provided with a pivoted switch and having a straight longitudinal way for holding the ejector at the limit of its inward movement while the form is moving away from the veneer supplying means and provided with angularly disposed ways for moving the ejector inwardly and outwardly when the form is moved toward the veneer supplying means, the said switch being arranged to close the straight longitudinal way during the movement of the form toward the veneer supplying means.

55. In a veneer box making machine, the combination with veneer supplying means, of a form, means for imparting reciprocatory and rotary motions to the form to carry the same to the veneer supplying means to engage the veneer and backward therefrom to withdraw a sheet from the veneer supplying means and to wind the veneer on the form, an ejector movable with the form and slidable transversely thereof to discharge the veneer, means including a projecting member and a cam guide comprising an approximately triangular frame, a fixed inner member arranged in spaced relation with the opposite sides of the frame to form ways, and a pivoted guiding member or switch also operating between the sides of the frame to form ways.

56. In a veneer box making machine, the combination with veneer supplying means, of a form, means for imparting reciprocatory and rotary motions to the form to carry the same to the veneer supplying means to engage the veneer and backward therefrom to withdraw a sheet from the veneer supplying means and to wind the veneer on the form, an ejector movable with the form and slidable transversely thereof to discharge the veneer, means including a projecting member and a cam guide comprising an approximately triangular frame, a fixed inner member arranged in spaced relation with the opposite sides of the frame to form ways, a pivoted guiding member or switch also operating between the sides of the frame to form ways, and a spring connected with the pivoted guiding member or switch for holding the same normally in engagement with one of the sides of the frame.

57. In a veneer box making machine, the combination with veneer supplying means, of a form, means for imparting reciprocatory and rotary motions to the form to carry the same to the veneer supplying means to engage the veneer and backward therefrom to withdraw a sheet from the veneer supplying means and to wind the veneer on the form, an ejector movable with the form and slidable transversely thereof to discharge the veneer, means including a projecting member and a cam guide comprising a substantially triangular frame having opposite end loops forming straight ways, an inner fixed guiding member spaced from the opposite sides of the frame to form ways, and a pivoted guiding member or switch operating between the sides of the frame and movable between the same.

58. In a veneer box making machine, the combination of a reciprocatory carriage, a rotary form mounted on the carriage and adapted to have a sheet of veneer wound around it, an ejector movable across the form, and relatively fixed angularly related means arranged in the path of the carriage for actuating the ejector for moving the same outwardly to discharge the veneer from the form and for moving the ejector inwardly.

59. In a veneer box making machine, the combination of a reciprocatory carriage, a rotary form mounted on the carriage, a slide movable across the carriage, an ejector carried by the slide, and angularly related means located in the path of the carriage and engaging the slide to move the ejector inwardly and outwardly when the carriage is reciprocated.

60. In a veneer box making machine, the combination with veneer supplying mechanism of a reciprocatory carriage, a rotary form mounted on the carriage, a slide movable across the carriage and movable to the veneer supplying mechanism to engage the veneer and backward therefrom to withdraw a sheet from the said mechanism, an ejector carried by the slide, and guiding means arranged in the path of the slide and engaging the same to actuate the ejector, said guiding means presenting a continuous straight way during one stroke of the carriage and presenting angularly related ways to the slide during the other stroke of the carriage for moving the ejector inwardly and outwardly during such latter stroke and for discharging the veneer at an intermediate point between the limits of the travel of the carriage.

61. In a veneer box making machine, the combination with veneer supplying mechanism of a reciprocatory carriage, a rotary form mounted on the carriage, a slide movable across the carriage and movable to the veneer supplying mechanism to engage the veneer and backward therefrom to withdraw a sheet from the said mechanism, an ejector carried by the slide, guiding means arranged in the path of the slide and engaging the same to actuate the ejector, said guiding means presenting a continuous straight way during one stroke of the carriage and presenting angularly related ways to the slide during the other stroke of the carriage for moving the ejector inwardly and outwardly during such latter stroke to effect a discharge of the veneer at an intermediate point between the limits of the travel of the carriage, and means for automatically switching the slide from the continuous straight way to the angularly related ways.

62. In a veneer box making machine, the combination of a frame provided with ways and having a fixed rack, a carriage slidable in the ways, a shaft journaled on the carriage and having a pinion meshing with the rack, a form carried by the shaft and adapted to have a sheet of veneer wound around it, an ejector slidably mounted on the shaft and movable over the form to discharge the veneer therefrom, a slide movable on the carriage and connected with the ejector, and angularly related relatively fixed means arranged in the path of the slide for moving the same laterally of the machine to operate the ejector.

63. In a veneer box making machine, the combination of a frame, a reciprocatory carriage mounted thereon, a form carried by the carriage, means for rotating the form during the reciprocation of the carriage to wind a sheet of veneer around it, a rock arm detachably engaging the carriage for reciprocating the same and having means for disengaging itself from the carriage at one end of the stroke thereof to permit the carriage to remain at rest during a portion of the movement of the rock arm, and means for actuating the rock arm.

64. In a veneer box making machine, the combination of a frame, a reciprocatory carriage mounted thereon, a form carried by the carriage, means for rotating the form during the reciprocation of the carriage to wind a sheet of veneer around it, a rock arm detachably engaging the carriage for reciprocating the same and having means for disengaging itself from the carriage at one end of the stroke thereof to permit the carriage to remain at rest during a portion of the movement of the rock arm, means for actuating the rock arm, and means for stapling the veneer while the carriage is stationary.

65. In a veneer box making machine, the combination of a frame, a reciprocatory carriage mounted thereon, a form carried by the carriage, means for rotating the form during the reciprocation of the carriage to wind a sheet of veneer around it, a rock arm provided with a substantially U-shaped portion for engaging the carriage, one side of the U-shaped portion being shorter than the other and the rock arm being pivoted to one side of the center of the travel of the carriage to permit the short arm to disengage the carriage at one end of the stroke and to retain the said short arm in engagement with the carriage at the other end of the stroke.

66. In a veneer box making machine, the combination of a frame, a reciprocatory carriage mounted thereon, a form carried by the carriage, means for rotating the form during the reciprocation of the carriage to wind a sheet of veneer around it, a rock arm for actuating the carriage provided with means for disengaging the same at one end of the stroke to permit the carriage to remain stationary during a portion of the movement of the rock arm, and a yieldable connection between the rock arm and the carriage.

67. In a veneer box making machine, the combination of a frame, a reciprocatory carriage mounted thereon, a form carried by the carriage, means for rotating the form during the reciprocation of the carriage to wind a sheet of veneer around it, a rock arm for actuating the carriage provided with means for disengaging the same at one end of the stroke to permit the carriage to remain stationary during a portion of the movement of the rock arm, a buffer arranged in the path of the carriage and adjustable to change the position of the carriage, and a yieldable connection between the rock arm and the carriage for holding the latter firmly against the buffer while in engagement with the same.

68. In a veneer box making machine, the combination of a frame, a reciprocatory carriage mounted thereon, a form carried by the carriage, means for rotating the form during the reciprocation of the carriage to wind a sheet of veneer around it, a rock arm for actuating the carriage provided with means for disengaging the same at one end of the stroke to permit the carriage to remain stationary during a portion of the movement of the rock arm, an auxiliary rock arm connected with the carriage, yieldable means for connecting the rock arms, and a cushioning device carried by the auxiliary rock arm and arranged to be engaged by the other rock arm to prevent jar when the latter rock arm reëngages the carriage.

69. In a veneer box making machine, the combination of a frame, a reciprocatory carriage mounted thereon, a form carried by the carriage, means for rotating the form during the reciprocation of the carriage to wind a sheet of veneer around it, a rock arm for actuating the carriage provided with means for disengaging the same at one end of the stroke to permit the carriage to remain stationary during a portion of the movement of the rock arm, an auxiliary rock arm connected with the carriage, and a yieldable connection between the rock arms including a rod secured to one of the rock arms and a coiled spring disposed on the rod and engaging the other rock arm.

70. In a veneer box making machine, the combination of a frame, a reciprocatory carriage mounted thereon, a form carried by the carriage, means for rotating the form during the reciprocation of the carriage to wind a sheet of veneer around it, a rock arm for actuating the carriage provided with means for disengaging the same at one end of the stroke to permit the carriage to remain stationary during a portion of the movement of the rock arm, an auxiliary rock arm connected with the carriage, a yieldable connection between the rock arms, and a cushioning device mounted on the auxiliary rock arm and including a rod extending into the path of the other rock arm, and a coiled spring for cushioning the rod.

71. In a veneer box making machine, the combination of a frame, a reciprocatory carriage mounted thereon, a form carried by the carriage, means for rotating the form during the reciprocation of the carriage to wind a sheet of veneer around it, a rock arm for actuating the carriage provided with means for disengaging the same at one end of the stroke to permit the carriage to remain stationary during a portion of the movement of the rock arm, an auxiliary rock arm connected with the carriage, a yieldable connection between the rock arms, a cushioning device mounted on the auxiliary rock arm and including a rod extending into the path of the other rock arm, a coiled spring for cushioning the rod, and a tubular casing receiving the coiled spring and composed of adjustable sections, one of the sections being mounted on the auxiliary rock arm, and the other forming a guide for the rod and engaging the spring.

72. In a veneer box making machine, the combination of a frame, a reciprocatory carriage mounted thereon, a form carried by the carriage, means for rotating the form during the reciprocation of the carriage to wind a sheet of veneer around it, an actuating rock arm for the carriage provided with means for disengaging itself from the carriage on one stroke, an auxiliary rock arm, links connecting the auxiliary rock arm with the carriage and extended to form a guide for the actuating rock arm when the latter disengages itself from the carriage, and a yieldable connection between the rock arms.

73. In a veneer box making machine, the combination of a frame, a reciprocatory carriage mounted thereon, a form carried by the carriage, means for rotating the form during the reciprocation of the carriage to wind a sheet of veneer around it, an actuating rock arm for the carriage provided with means for disengaging itself from the carriage on one stroke, an auxiliary rock arm, a link connection between the auxiliary rock arm and the carriage, yieldable means for connecting the auxiliary rock arm with the actuating rock arm, and a pivoted spring actuated finger mounted on the actuating rock arm for guiding the same into engagement with the carriage.

74. In a veneer box making machine, the combination of a frame, a reciprocatory carriage mounted thereon, a form carried by the carriage, means for rotating the form during the reciprocation of the carriage to wind a sheet of veneer around it, a rock arm for actuating the carriage provided with a substantially U-shaped portion engaging the carriage and having one side shorter than the other to disengage itself from the carriage on one stroke, and a pivoted yieldably supported finger mounted on the rock arm at the said short side for guiding the same into engagement with the carriage.

75. In a veneer box making machine, the combination of a frame, a reciprocatory carriage mounted thereon, a form carried by the carriage, means for rotating the form during the reciprocation of the carriage to wind a sheet of veneer around it, ears depending from the carriage, an auxiliary rock arm, links connecting the auxiliary rock arm with the ears, an anti-friction roller mounted between the ears, an actuating rock arm having a U-shaped portion engaging the roller and having the short side adapted to disengage itself from the roller on one stroke of the actuating rock arm, a yieldably mounted finger for guiding the short side into engagement with the roller, and means for connecting the rock arms.

76. In a veneer box making machine, the combination with veneer supplying mechanism provided with means for holding a sheet of veneer, of a shaft, a form loose on the shaft, a combined gripping and actuating member connected with the shaft and arranged to clamp the veneer against the form and rotate the latter to wind the veneer thereon, and a friction device independent of the other member and resisting the rotary movement of the form to enable the veneer to be clamped by the gripping device with sufficient force to withdraw the veneer from the holding means.

77. In a veneer box making machine, the combination with veneer supplying means, a shaft, a form having a sleeve mounted on the shaft, and a gripping device connected with the shaft and coöperating with the form, of a friction device for resisting the rotary movement of the form to enable the veneer to be clamped by the gripping device with sufficient force to withdraw the said veneer from the veneer supplying means, said friction device including a sectional bearing receiving the ring, a spring engaging one of the sections, and means for controlling the tension of the spring.

78. In a veneer box making machine, the combination with veneer supplying means, a shaft, a form having a sleeve mounted on the shaft, and a gripping device connected with the shaft and coöperating with the form, of a friction device for resisting the rotary movement of the form to enable the veneer to be clamped by the gripping device with sufficient force to withdraw the said veneer from the veneer supplying means, said friction device including a bearing receiving the sleeve and composed of upper and lower sections, the lower section being provided with a convex fulcrum, means for loosely securing one end of the upper section with the said fulcrum, and yieldable means for engaging the other end of the upper section.

79. In a veneer box making machine, the combination of a reciprocatory carriage, a form mounted on the carriage, means for rotating the form to wind a sheet of veneer around the same, a rock arm for reciprocating the carriage provided with means for disengaging itself from the carriage to permit the carriage to remain stationary during a portion of the movement of the rock arm, cushioning means for stopping the movement of the carriage without jar, and cushioning means for enabling the rock arm to reëngage the carriage and start the same without jar.

80. In a veneer box making machine, the combination of a reciprocatory carriage, a form mounted on the carriage, means for rotating the form to wind a sheet of veneer around the same, a rock arm for reciprocating the carriage provided with means for disengaging itself from the carriage to permit the carriage to remain stationary during a portion of the movement of the rock arm, cushioning means for stopping the movement of the carriage without jar, means for stapling the veneer while the carriage is stationary, and cushioning means for enabling the rock arm to reëngage the carriage and start the same without jar.

81. In a veneer box making machine, the combination of a reciprocatory carriage, a form mounted on the carriage, means for rotating the form to wind a sheet of veneer around the same, a rock arm for reciprocating the carriage provided with means for disengaging itself from the carriage to permit the carriage to remain stationary during a portion of the movement of the rock arm, a cushioning device connected with the rock arm and increasing in force with the movement of the arm from the carriage, and a reversely arranged device for cushioning the rock arm, the latter cushioning device increasing in force with the movement of the rock arm toward the carriage.

82. In a veneer box making machine, the combination of a reciprocatory carriage, a form mounted on the carriage, means for rotating the form to wind a sheet of veneer around the same, a rock arm for reciprocating the carriage provided with means for disengaging itself from the carriage to permit the carriage to remain stationary during a portion of the movement of the rock arm, a cushioning device connected with the rock arm and increasing in force with the movement of the arm from the carriage, and a reversely arranged cushioning device located in the path of the carriage and increasing in power with the movement of the arm toward the carriage.

83. In a veneer box making machine, the combination of a reciprocatory carriage, a form mounted on the carriage, means for rotating the form to wind a sheet of veneer around the same, a rock arm for reciprocating the carriage provided with means for disengaging itself from the carriage to permit the carriage to remain stationary during a portion of the movement of the rock arm, a cushioning device forming a yieldable connection between the carriage and the rock arm and increasing in force with the movement of the rock arm with the carriage, and a second cushioning device for the rock arm increasing in force with the movement of the rock arm toward the carriage.

84. In a veneer box making machine, the combination with veneer supplying means, of a form, means for imparting reciprocatory and rotary motions to the same to carry the form to the veneer supplying means to engage the veneer and backward therefrom to withdraw a sheet from the said veneer supplying means and to wind the veneer around the form, a clamp arranged to engage the veneer exteriorly of the form, and automatically operable means for maintaining the clamp in engagement with the veneer when the form moves away from the veneer supplying means and for holding the said clamp out of engagement with the veneer when the form moves toward the veneer supplying means.

85. In a veneer box making machine, the combination of a frame, a reciprocatory carriage mounted thereon, a rock arm for actuating the carriage provided with means for disengaging itself from the carriage on one stroke to permit the carriage to remain stationary during a portion of the movement of the rock arm, said rock arm being adapted to reëngage the carriage on the other stroke, and cushioning means for enabling the carriage to stop and start without jar.

86. In a veneer box making machine, the combination of a frame, a reciprocatory carriage, a rock arm for actuating the carriage provided with a substantially U-shaped engaging portion having one of its sides shorter than the other, the said rock arm being pivoted to one side of the center of the travel of the carriage to permit the short arm to disengage the carriage at one end of the stroke and to retain the U-shaped portion in engagement with the carriage at the other end of the stroke, and cushioning means for enabling the rock arm and the carriage to be rapidly operated without jar.

87. In a veneer box making machine, the combination with veneer supplying means, of a shaft, a form loose on the shaft and provided with a combined gripping and actuating member for engaging the veneer and for rotating the form, said member being connected with the shaft, and a friction device independent of the combined gripping and actuating member and receiving and constituting a bearing for the shaft and provided with means for engaging the same for resisting the rotary movement of the form to enable the veneer to be clamped by the gripping device with sufficient force to withdraw the said veneer from the supplying means.

88. In a veneer box making machine, the combination with supplying mechanism provided with means for holding a sheet of veneer, of a shaft, a form loose on the shaft, a combined gripping and actuating member connected with the shaft and arranged to clamp the veneer against the form and rotate the latter for winding the veneer thereon, and an adjustable friction device resisting the rotary movement of the form and controlling the clamping action of the said member.

In testimony, that I claim the foregoing as my own, I have hereto affixed my signature in the presence of two witnesses.

ORIN C. FENLASON.

Witnesses:
SAM. L. WINTER,
ALTON R. KELLOGG.

Copies of this patent may be obtained for five cents each, by addressing the "Commissioner of Patents, Washington, D. C."